United States Patent
Han

(10) Patent No.: US 12,086,396 B2
(45) Date of Patent: Sep. 10, 2024

(54) PICTURE SYNTHESIS METHOD AND APPARATUS, AND ELECTRONIC DEVICE

(71) Applicant: VIVO MOBILE COMMUNICATION CO., LTD., Dongguan (CN)

(72) Inventor: Guimin Han, Dongguan (CN)

(73) Assignee: VIVO COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/078,887

(22) Filed: Dec. 9, 2022

(65) Prior Publication Data

US 2023/0106434 A1   Apr. 6, 2023

Related U.S. Application Data

(63) Continuation of application No. PCT/CN2021/099182, filed on Jun. 9, 2021.

(30) Foreign Application Priority Data

Jun. 11, 2020 (CN) .......................... 202010531536.1

(51) Int. Cl.
*G06F 3/04845* (2022.01)
*G06F 3/0488* (2022.01)
(Continued)

(52) U.S. Cl.
CPC ........ *G06F 3/04845* (2013.01); *G06F 3/0488* (2013.01); *G06F 3/14* (2013.01);
(Continued)

(58) Field of Classification Search
CPC ...... G06F 3/04845; G06F 7/62; G06F 3/0488; G06F 3/14; G06T 5/50; G06T 2207/20132
See application file for complete search history.

(56) References Cited

U.S. PATENT DOCUMENTS

| | | | |
|---|---|---|---|
| 2004/0130626 A1 | 7/2004 | Ouchi et al. | |
| 2005/0069225 A1* | 3/2005 | Schneider | .......... H04N 21/8583 382/305 |
| 2011/0134208 A1* | 6/2011 | Kuraoka | .............. H04N 1/3876 348/36 |

(Continued)

FOREIGN PATENT DOCUMENTS

| | | |
|---|---|---|
| CN | 104103085 A | 10/2014 |
| CN | 105100642 A | 11/2015 |

(Continued)

OTHER PUBLICATIONS

International Search Report issued in corresponding International Application No. PCT/CN2021/099182, mailed Sep. 15, 2021, 6 pages.

(Continued)

*Primary Examiner* — Kwang-Su Yang
(74) *Attorney, Agent, or Firm* — IPX PLLC

(57) ABSTRACT

A picture processing method and an electronic device are provided. The method includes: receiving a first input by a user in a case that a first interface is displayed. The first interface includes N target identifiers. The first input is an input by the user for M target identifiers in the N target identifiers. N and M are both integers greater than 1. M is less than or equal to N. The method further comprises updating the first interface to a second interface in response to the first input. The second interface includes M pictures indicated by the M target identifiers. The method also includes receiving a second input by the user for the M pictures. In response to the second input, the method additionally includes performing synthesis processing on the M pictures according to a size of each of the M pictures to obtain a target synthesized picture.

14 Claims, 16 Drawing Sheets

(51) Int. Cl.
*G06F 3/14* (2006.01)
*G06T 5/50* (2006.01)
*G06T 7/62* (2017.01)

(52) U.S. Cl.
CPC .................. *G06T 5/50* (2013.01); *G06T 7/62* (2017.01); *G06T 2207/20132* (2013.01)

(56) References Cited

U.S. PATENT DOCUMENTS

| | | |
|---|---|---|
| 2014/0325439 A1 | 10/2014 | Sohn et al. |
| 2015/0067554 A1 | 3/2015 | Lee et al. |
| 2015/0070523 A1 | 3/2015 | Chao |
| 2016/0139774 A1* | 5/2016 | Rivard .................. H04N 23/74 715/781 |

FOREIGN PATENT DOCUMENTS

| | | |
|---|---|---|
| CN | 106484251 A | 3/2017 |
| CN | 108399038 A | 8/2018 |
| CN | 110063738 A | 7/2019 |
| CN | 110084871 A | 8/2019 |
| CN | 110490808 A | 11/2019 |
| CN | 111124231 A | 5/2020 |
| CN | 111833247 A | 10/2020 |
| JP | H09297750 A | 11/1997 |
| JP | H10051647 A | 2/1998 |
| JP | H11259637 A | 9/1999 |
| JP | 2004135230 A | 4/2004 |
| JP | 2010182004 A | 8/2010 |
| JP | 2011186742 A | 9/2011 |

OTHER PUBLICATIONS

Extended European Search Report issued in related European Application No. 21822401.2, mailed Oct. 27, 2023, 8 pages.
Notice of Reasons for Refusal issued in related Japanese Application No. 2022-576090, mailed Jan. 23, 2024, 9 pages.
Notice of Reasons for Refusal issued in related Japanese Application No. 2022-576090, mailed Jul. 9, 2024, 11 pages.

* cited by examiner

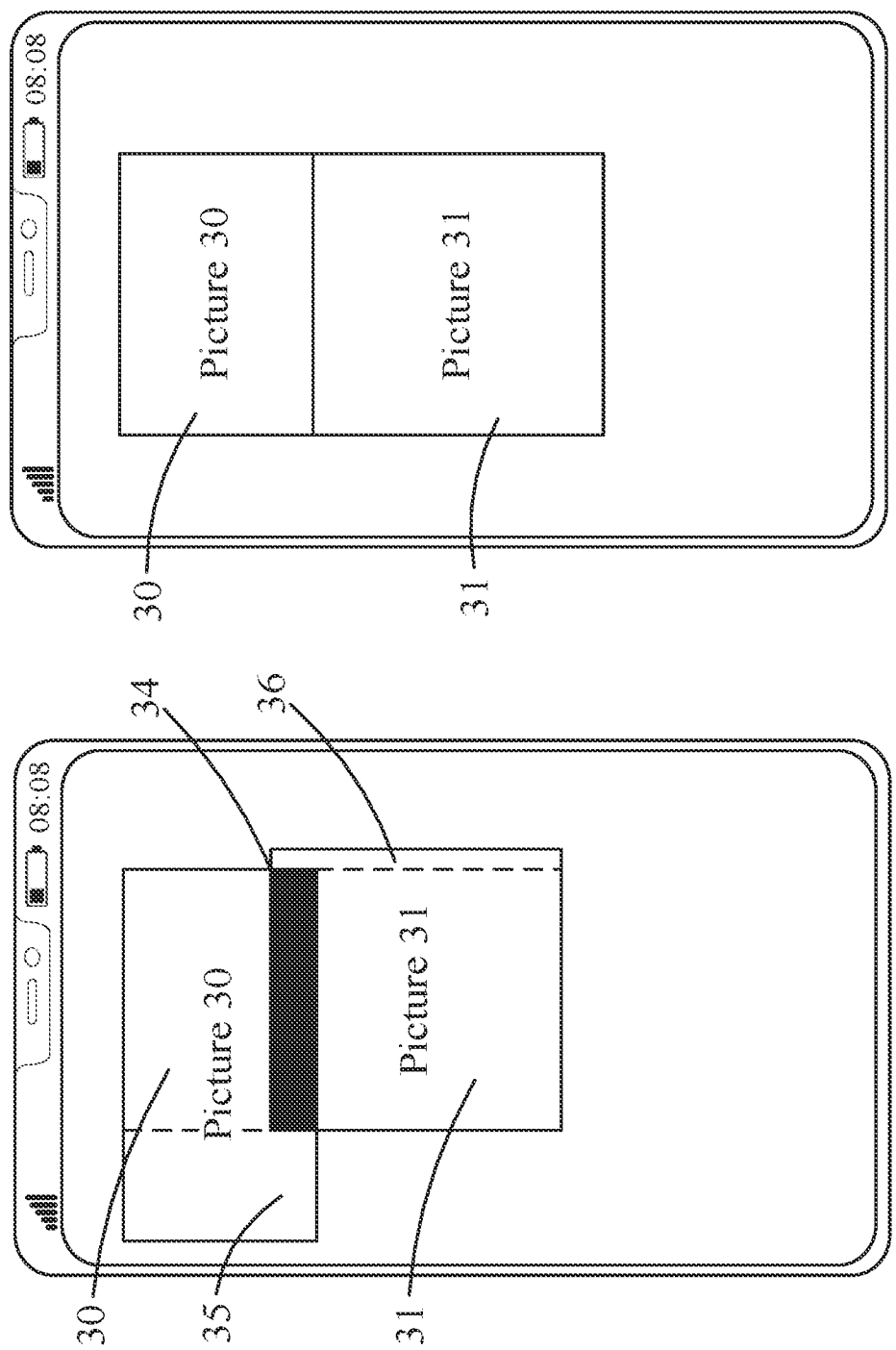

PICTURE SYNTHESIS METHOD AND APPARATUS, AND ELECTRONIC DEVICE

CROSS-REFERENCE TO RELATED APPLICATIONS

This application is a continuation of International Application No. PCT/CN2021/099182, filed on Jun. 9, 2021, which claims priority to Chinese Patent Application No. 202010531536.1 filed on Jun. 11, 2020. The entire contents of each of the above-referenced applications are expressly incorporated herein by reference.

TECHNICAL FIELD

This application relates to the technical field of communication, in particular, to a picture processing method and apparatus, and an electronic device.

BACKGROUND

Generally, when a user needs to stitch multiple pictures to obtain a combined picture, the user can firstly crop each picture in the multiple pictures through an electronic device to obtain multiple pictures of a suitable size or shape, and then perform a stitching operation on the cropped pictures to obtain a combined picture.

However, in the above method, since the user needs to perform a cropping operation on each picture first and then perform a stitching operation on the cropped pictures, the user's operation is complicated and time-consuming, and thus the efficiency of obtaining a combined picture by the electronic device is low.

SUMMARY

The objective of the embodiments of this application is to provide a picture processing method and apparatus and an electronic device.

This application is implemented as follows.

In a first aspect, the embodiments of this application provide a picture processing method, including: receiving a first input by a user in a case that a first interface is displayed, where the first interface includes N target identifiers, each target identifier indicates a picture respectively, the first input is an input by the user for M target identifiers in the N target identifiers, N and M are both integers greater than 1, and M is less than or equal to N, updating the first interface to a second interface in response to the first input, where the second interface includes M pictures indicated by the M target identifiers; receiving a second input by the user for the M pictures; and in response to the second input, performing synthesis processing on the M pictures according to a size of each of the M pictures to obtain a target synthesized picture.

In a second aspect, the embodiments of this application provide a picture processing apparatus, including a receiving module, an updating module, and a processing module. The receiving module is configured to receive a first input by a user in a case that a first interface is displayed. The first interface includes N target identifiers, each target identifier indicates a picture respectively, the first input is an input by the user for M target identifiers in the N target identifiers, N and M are both integers greater than 1, and M is less than or equal to N. The updating module is configured to update the first interface to a second interface in response to the first input received by the receiving module. The second interface includes M pictures indicated by the M target identifiers. The receiving module is further configured to receive a second input by the user for the M pictures. The processing module is configured to, in response to the second input received by the receiving module, perform synthesis processing on the M pictures according to a size of each of the M pictures to obtain a target synthesized picture.

In a third aspect, the embodiments of this application provide an electronic device, including a processor, a memory, and a program or instruction that is stored on the memory and executable on the processor, where the program or instruction, when executed by the processor, implements the steps of the method according to the first aspect.

In a fourth aspect, the embodiments of this application provide a readable storage medium, having a program or instruction stored thereon, where the program or instruction, when executed by a processor, implements the steps of the method according to the first aspect.

In a fifth aspect, the embodiments of this application provide a chip, including a processor and a communication interface, where the communication interface is coupled to the processor, and the processor is configured to execute a program or instruction to implement the method according to the first aspect.

In the embodiments of this application, when an electronic device displays a first interface, a user can perform an input on M target identifiers in N target identifiers displayed in the first interface to trigger the electronic device to update the first interface to a second interface, so that the user can perform a second input on M pictures indicated by the M target identifiers displayed in the second interface, and the electronic device can perform synthesis processing on the M pictures according to the size of each picture in the M pictures, to obtain a target synthesized picture. When the user needs to perform synthesis processing on multiple pictures through the electronic device, the user can perform, in an interface that includes identifiers corresponding to the multiple pictures and is displayed by the electronic device, an input on the identifiers corresponding to the multiple pictures, so that the electronic device can display another interface including these pictures. The user can perform an input on the pictures in the another interface, so that the electronic device can adjust the display position and display size of each of the pictures according to the input by the user, and perform synthesis processing on the pictures according to the size of each of the pictures to obtain a target synthesized picture. There is no need for the user to first edit each of the pictures separately through the electronic device to obtain a picture of a size required for picture synthesis, and then perform synthesis processing on the edited pictures to obtain a synthesized picture. Therefore, user operations are reduced, thereby improving the efficiency of obtaining a synthesized picture through processing by an electronic device.

BRIEF DESCRIPTION OF THE DRAWINGS

FIG. 14A and FIG. 14B illustrate a ninth schematic diagram of an example of a mobile phone interface according to embodiments of this application.

DETAILED DESCRIPTION

The technical solutions in the embodiments of this application will be described below with reference to the accompanying drawings in the embodiments of this application. Apparently, the described embodiments are only some embodiments rather than all the embodiments of this application. All other embodiments obtained by a person of ordinary skill in the art based on the embodiments of this application without creative efforts fall within the scope of protection of this application.

In the description and claims of this application, the terms "first", "second", and so on are intended to distinguish similar objects but are not intended to indicate a specific order or sequence. It is to be understood that the data termed in such a way are interchangeable in appropriate circumstances, so that the embodiments of this application can be implemented in orders other than the order illustrated or described herein. In addition, the expression "and/or" in the description and claims indicates at least one of the joined objects, and the character "/" generally indicates that the associated objects are in an "or" relationship.

The picture processing method according to embodiments of this application will be described in detail below through specific embodiments and application scenarios with reference to the accompanying drawings.

In the embodiments of this application, if a user needs to crop and stitch multiple pictures through an electronic device, when the electronic device displays an interface corresponding to a photo gallery application, the user can perform a selection input on some picture thumbnails in multiple picture thumbnails displayed in the interface, so that the electronic device can update the interface corresponding to the photo gallery application to a picture editing interface, and display pictures corresponding to the picture thumbnails selected by the user in the picture editing interface, thereby allowing the user to perform inputs on these pictures displayed in the picture editing interface (for example, adjusting positions or sizes of the pictures, etc.). In this way, the electronic device can crop and stitch these pictures according to the user's inputs and the overlap size between every two pictures in these pictures (i.e., first cropping pictures having overlap regions, and then stitching the displayed pictures together), so as to obtain a synthesized picture. There is no need to use a conventional method in which the user first crops each of multiple pictures to be stitched through an electronic device to obtain pictures of sizes required for picture stitching, and then stitches the multiple cropped pictures to obtain a synthesized picture. Therefore, user operations can be reduced, thereby improving the efficiency of obtaining a combined picture through processing by an electronic device.

Figure 1:
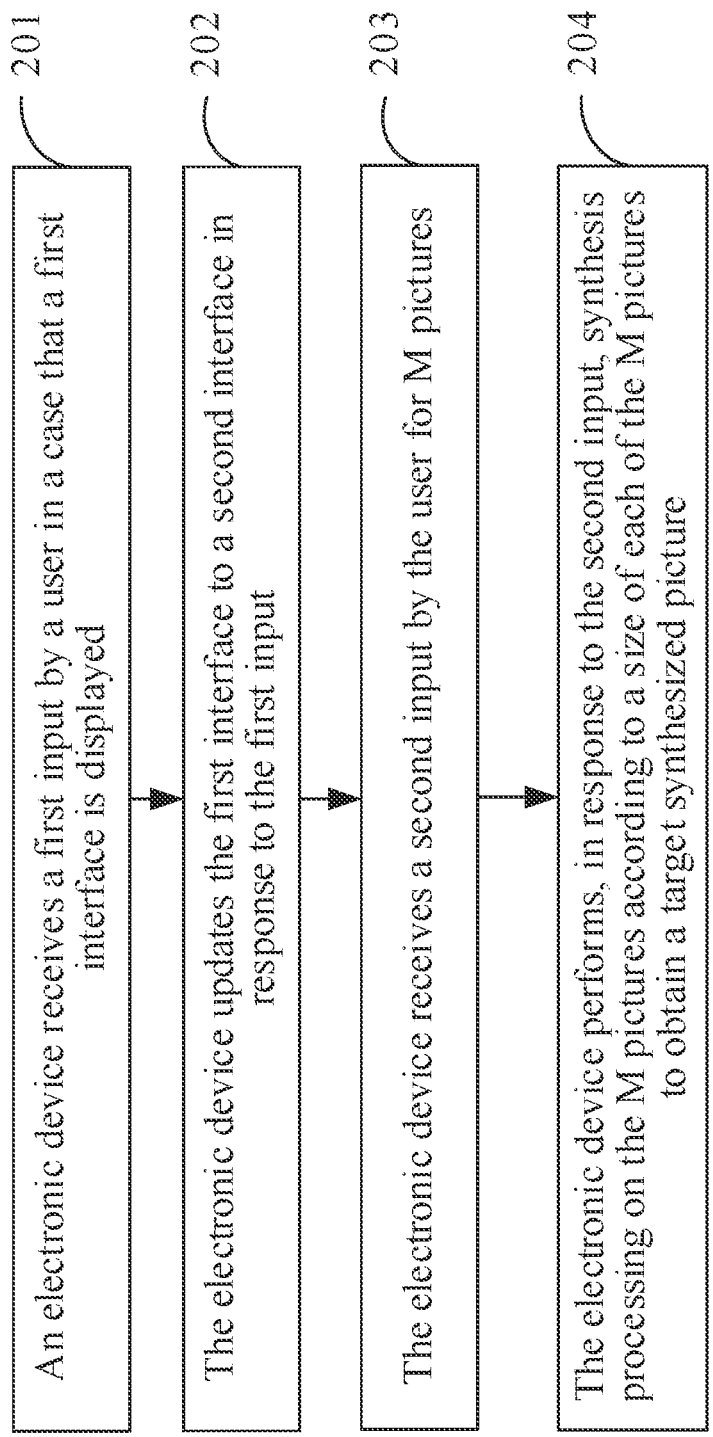
FIG. 1 is a first schematic diagram of a picture processing method according to embodiments of this application.

The embodiments of this application provide a picture processing method. FIG. 1 is a flowchart of a picture processing method according to the embodiments of this application. The method can be applied to an electronic device. As shown in FIG. 1, the picture processing method according to the embodiments of this application includes step 201 to step 204 below.

Step 201: An electronic device receives a first input by a user in a case that a first interface is displayed.

In the embodiments of this application, the first interface includes N target identifiers, each target identifier indicates a picture respectively, the first input is an input by the user for M target identifiers in the N target identifiers, N and M are both integers greater than 1, and M is less than or equal to N.

In the embodiments of this application, the user can perform the first input on some picture identifiers in the multiple picture identifiers displayed in the first interface, so that the electronic device can display a second interface and display some pictures indicated by the some picture identifiers in the second interface. The user can perform an input on these pictures, so that the electronic device can perform synthesis processing on these pictures to obtain a synthesized picture corresponding to these pictures.

For example, in the embodiments of this application, the first interface is a picture thumbnail display interface in a photo gallery application, and the user triggers the electronic device to run the photo gallery application, so as to display the first interface.

For example, in the embodiments of this application, the target identifiers are any one of the following: thumbnails of pictures, names of pictures, serial numbers of pictures, or the like.

In a case that the target identifiers are thumbnails of pictures, the sizes (for example, areas) of the N target identifiers displayed in the first interface may be the same or different.

For example, in the embodiments of this application, the first input is a drag input by the user for a certain target identifier; or, the first input is a selection input by the user for some target identifiers, and a drag input for a certain target identifier in these target identifiers.

For example, in the embodiments of this application, in a case that M is equal to two, the first input is an input by the user dragging one target identifier to another target identifier.

It is to be understood that when the first input by the user is an input for two target identifiers, the user can directly drag one target identifier to another target identifier (i.e., dragging one target identifier from the display position of the one target identifier to the display position of another target identifier), so that there is an overlap region between the one target identifier and the another target identifier. There is no need to select the two target identifiers first and then perform the drag input.

The overlap region can be understood as that one identifier covers part or all of the other identifier, or that one picture covers part or all of the other picture.

Figure 2B:
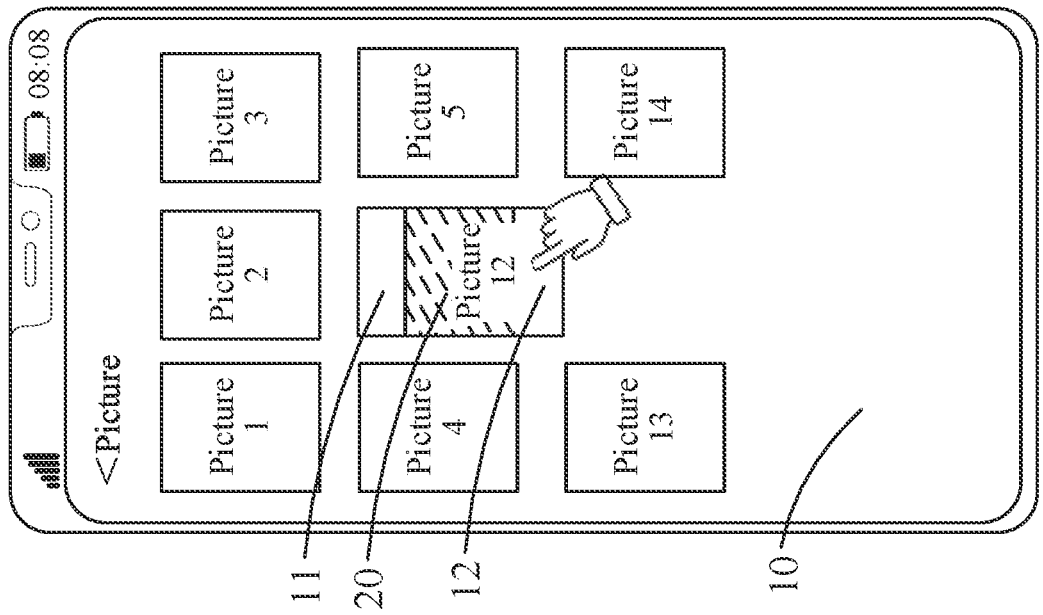
FIG. 2A and FIG. 2B illustrate a first schematic diagram of an example of a mobile phone interface according to embodiments of this application.
Figure 2A:
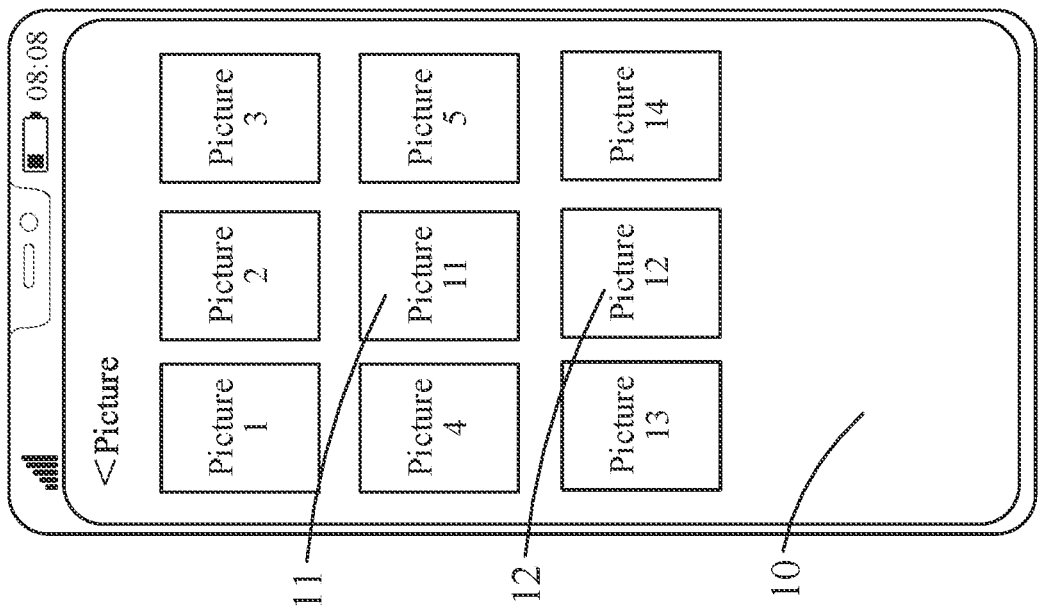

Exemplarily, the electronic device being a mobile phone is taken as an example for description. As shown in FIG. 2A, the mobile phone displays a picture thumbnail display interface 10 of a photo gallery application, and if the user needs to synthesize a picture 11 and a picture 12 in the picture thumbnail display interface 10, as shown in FIG. 2B, the user can perform a drag input on the picture 12, so that there is an overlap region 20 between the picture 11 and the picture 12 (indicated by hatching in the drawing).

For example, in the embodiments of this application, in a case that M is greater than two, the first input includes a first sub-input and a second sub-input. The first sub-input is a selection input by the user for the M target identifiers, and the second sub-input is an input by the user dragging one target identifier in the M target identifiers to another target identifier in the M target identifiers. Or, the first sub-input is a selection input by the user for M−1 target identifiers in the N target identifiers, and the second sub-input is an input by the user dragging one target identifier in the M−1 target identifiers to another target identifier, or, the second sub-input is an input by the user dragging another target identifier to one target identifier in the M−1 target identifiers; and the another target identifier is an identifier other than the M−1 target identifiers in the N target identifiers.

It is to be understood that when the first input by the user is an input for at least two target identifiers, the user needs to perform a selection input on the target identifiers first, so as to trigger the electronic device to determine pictures corresponding to the target identifiers as pictures to be synthesized, and the user then drags one target identifier in the target identifiers to another target identifier, so that there is an overlap region between the one target identifier and the another target identifier.

It is to be understood that the user can directly determine M target identifiers through the first sub-input, or the user can first determine M−1 target identifiers through the first sub-input and then determine another target identifier through the second sub-input to determine M target identifiers. The specific steps for determining the M target identifiers are not described in detail in this application.

Figure 3A:
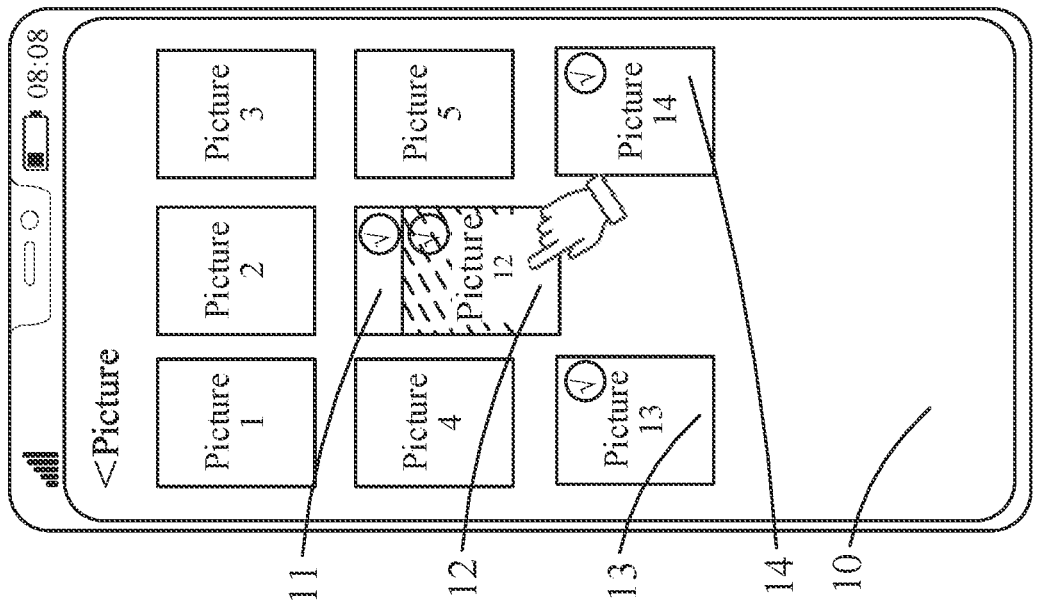
FIG. 3A and FIG. 3B illustrate a second schematic diagram of an example of a mobile phone interface according to embodiments of this application.
Figure 3B:
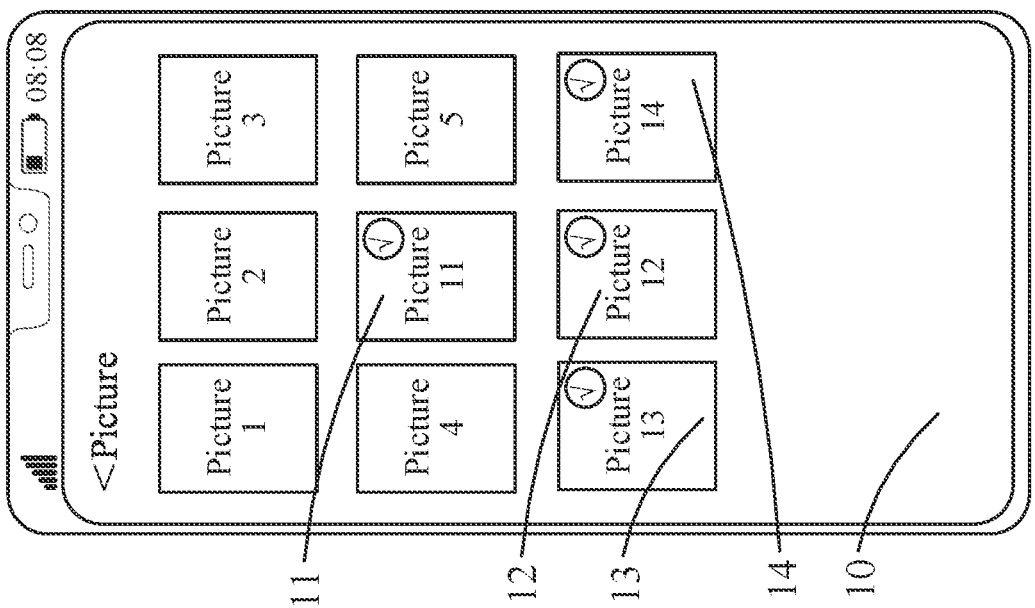

Exemplarily, as shown in FIG. 2A and FIG. 3A, in a case that the mobile phone displays a picture thumbnail display interface 10 of a photo gallery application, if the user needs to synthesize a picture 11, a picture 12, a picture 13, and a picture 14 in the picture thumbnail display interface 10, the user first performs a selection input on the picture 11, picture 12, picture 13, and picture 14, so that the mobile phone can mark these pictures. Then, as shown in FIG. 3B, the user performs a drag input on the picture 12, so that there is an overlap region between the picture 11 and the picture 12.

Step 202: The electronic device updates the first interface to a second interface in response to the first input.

In the embodiments of this application, the second interface includes M pictures indicated by M target identifiers.

For example, in the embodiments of this application, the second interface is a picture editing interface, the second interface further includes multiple controls, and the multiple controls are at least one of the following: filter controls, adjustment controls, graffiti controls, labeling controls, or the like.

For example, in the embodiments of this application, the second interface further includes a determining control, and the determining control is configured to trigger the electronic device to perform synthesis processing on pictures to obtain a synthesized picture.

For example, in the embodiments of this application, the electronic device arranges and displays the M pictures indicated by the M target identifiers in the second interface.

Figure 4:
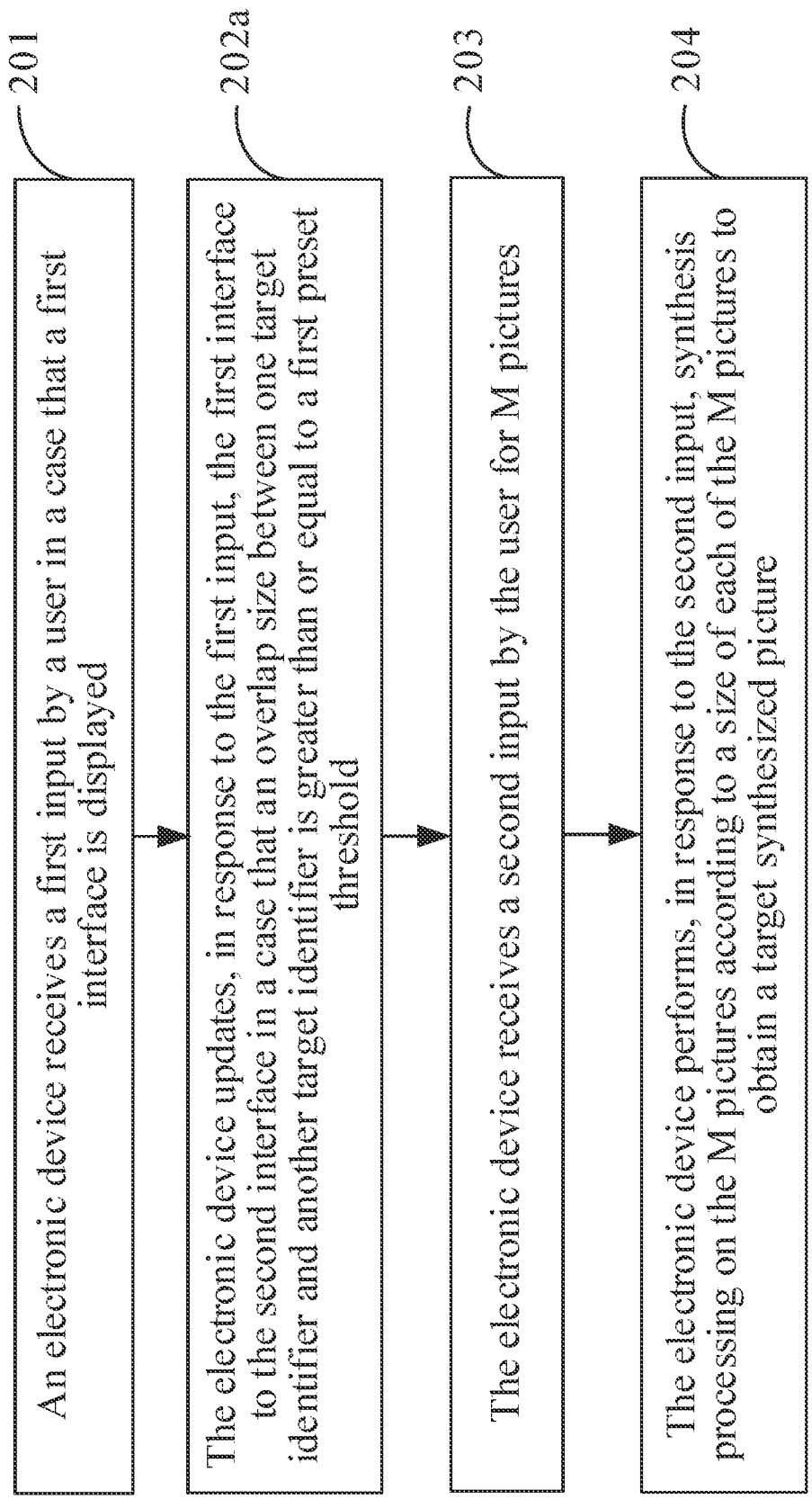
FIG. 4 is a second schematic diagram of a picture processing method according to embodiments of this application.

For example, in the embodiments of this application, with reference to FIG. 1 and FIG. 4, step 202 can be implemented by step 202a below.

Step 202a: The electronic device updates, in response to the first input, the first interface to the second interface in a case that an overlap size between the one target identifier and the another target identifier is greater than or equal to a first preset threshold.

For example, in the embodiments of this application, the overlap size is understood as the overlap area between the identifiers or the ratio of the overlap area between the identifiers to the area of a certain identifier.

For example, in the embodiments of this application, in a case that the overlap size is understood as the overlap area between the identifiers, the electronic device determines the overlap area between the one target identifier and the another target identifier, so that the electronic device can update the first interface to the second interface in a case that the overlap area between the one target identifier and the another target identifier is greater than or equal to a first preset area (i.e., the first preset threshold).

For example, in the embodiments of this application, in a case that the overlap size is understood as the ratio of the overlap area between the identifiers to the total area of a certain identifier, the electronic device determines the ratio of the overlap area between the one target identifier and the another target identifier to the area of the one target identifier (or the another target identifier), so that the electronic device can update the first interface to the second interface in a case that the ratio of the overlap area between the one target identifier and the another target identifier to the area of the one target identifier (or the another target identifier) is greater than or equal to a first preset ratio (i.e., the first preset threshold).

In the embodiments of this application, the electronic device can determine whether the overlap size between the one target identifier and the another target identifier satisfies a preset condition, so as to update the first interface to the second interface in a case that the overlap size between the one target identifier and the another target identifier satisfies the preset condition. Therefore, the electronic device can be prevented from updating the first interface to the second interface due to unintended touch by the user, and the accuracy of the electronic device in responding to the user input can be improved.

For example, in the embodiments of this application, the second interface includes a first preset region and a second preset region. The first preset region is configured to display a pinned-to-top picture, and in a case that any picture has an overlap region with the pinned-to-top picture, the pinned-to-top picture covers the any picture in the overlap region.

Figure 5:
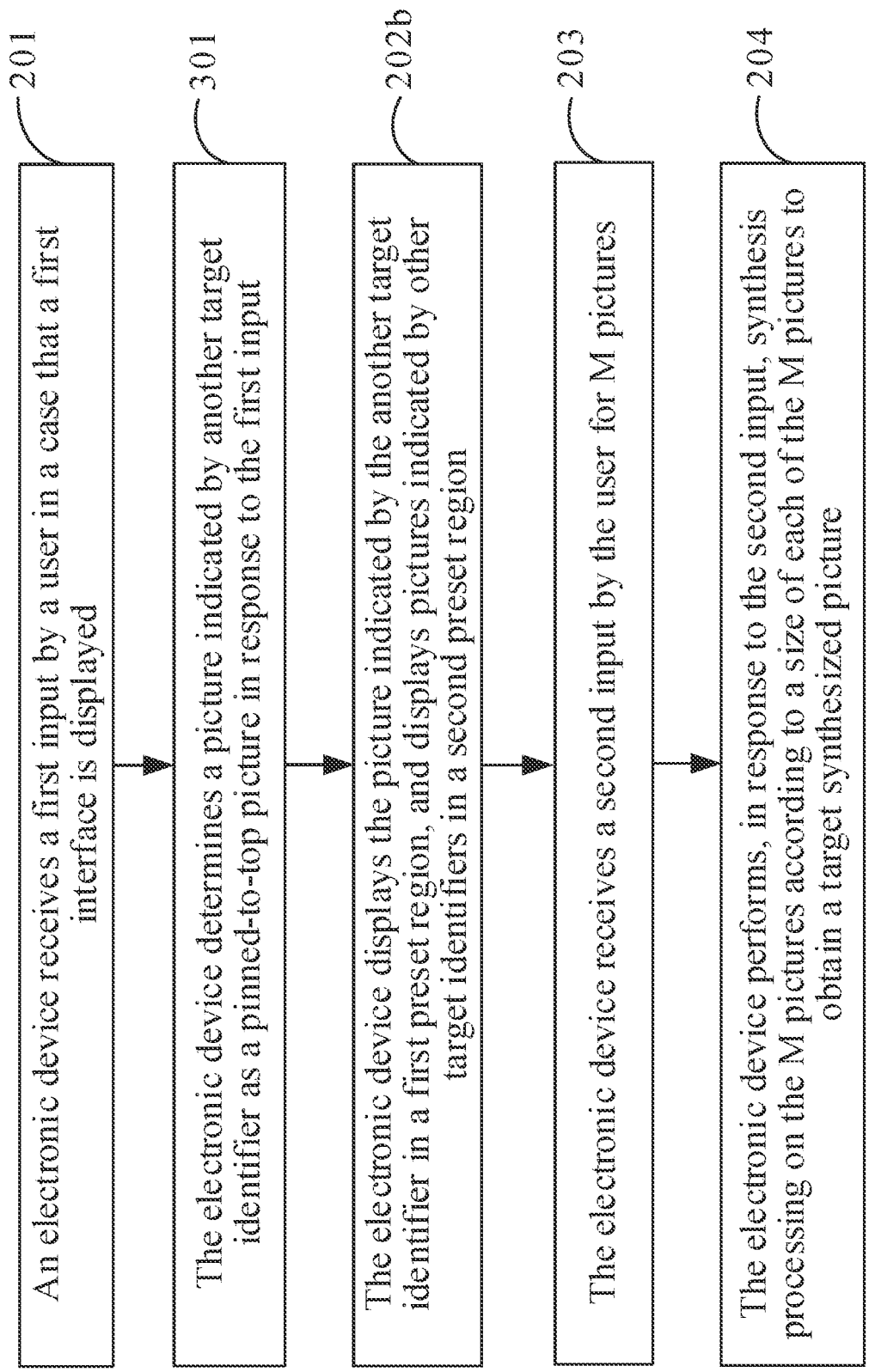
FIG. 5 is a third schematic diagram of a picture processing method according to embodiments of this application.

With reference to FIG. 1 and FIG. 5, before "updating the first interface to a second interface" in step 202, the picture processing method according to the embodiments of this application further includes step 301 below, and step 202 can be implemented by step 202b below.

Step 301: The electronic device determines a picture indicated by the another target identifier as the pinned-to-top picture in response to the first input.

For example, in the embodiments of this application, the electronic device determines the picture indicated by the one target identifier or the picture indicated by the another target identifier as the pinned-to-top picture according to the first input by the user.

For example, in the embodiments of this application, after the electronic device determines the picture indicated by the another target identifier as the pinned-to-top picture in response to the first input, the user first determines the picture indicated by the one target identifier as the pinned-to-top picture through an input, so as to switch the pinned-to-top picture.

For example, in the embodiments of this application, the user double-clicks the picture indicated by the one target identifier, so that the electronic device can switch the layer priorities of the picture indicated by the one target identifier and the picture indicated by the another target identifier (that is, the picture indicated by the one target identifier is determined as a pinned-to-top picture, and the picture indicated by the another target identifier is unpinned from top).

For example, in the embodiments of this application, after the electronic device determines the picture indicated by the one target identifier as a pinned-to-top picture and switches the pinned-to-top picture, the electronic device displays the picture indicated by the one target identifier in the first preset region, and displays the picture indicated by the another target identifier in the second preset region.

In a case that the first input is that the user drags one target identifier (for example, identifier A) to another target identifier (for example, identifier B), the electronic device may determine the picture indicated by the another target identifier (i.e., identifier B) as a pinned-to-top picture. Or, in a case that the first input is that the user drags the another target identifier (i.e., identifier B) to the one target identifier (i.e., identifier A), the electronic device may determine the picture indicated by the one target identifier (i.e., identifier A) as a pinned-to-top picture.

Step 202b: The electronic device displays the picture indicated by the another target identifier in the first preset region, and displays pictures indicated by other target identifiers in the second preset region.

In the embodiments of this application, the other target identifiers are identifiers other than the another target identifier in the M target identifiers.

For example, in the embodiments of this application, in a case that M is equal to two, the electronic device displays the picture indicated by the another target identifier in the first preset region, and displays the picture indicated by the one target identifier in the second preset region.

For example, in the embodiments of this application, the user triggers, through an input, the electronic device to display the picture indicated by the one target identifier in the first preset region, and display the picture indicated by the another target identifier in the second preset region.

Figure 6:
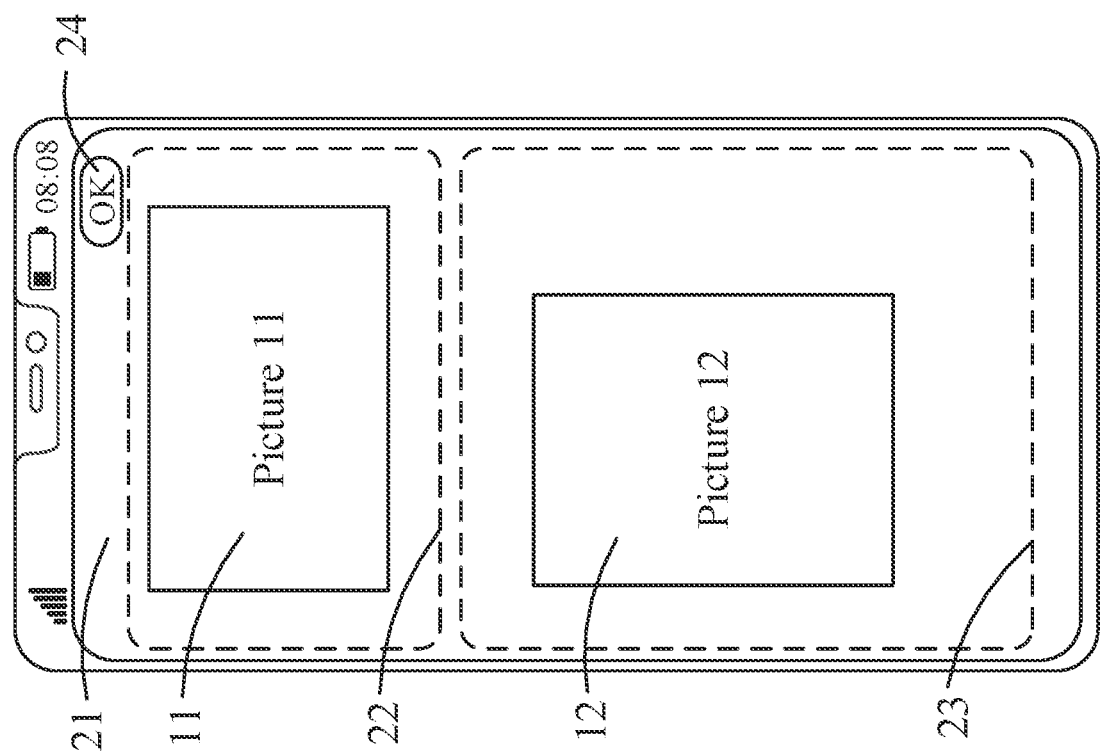
FIG. 6 is a third schematic diagram of an example of a mobile phone interface according to embodiments of this application.

Exemplarily, with reference to FIG. 2B, when the user makes an overlap region 20 formed between the picture 11 and the picture 12 through the first input, the mobile phone determines the ratio of the area of the overlap region 20 to the area of the picture 11 (or the picture 12). Thus, when the ratio of the area of the overlap region 20 to the area of the picture 11 (or the picture 12) is greater than or equal to a second preset ratio (for example, 60%), as shown in FIG. 6, the mobile phone updates the picture thumbnail display interface 10 to a picture editing interface 21. The picture editing interface 21 includes a first preset region 22, a second preset region 23, and a determining control 24. The mobile phone displays the picture 11 in the first preset region 22 and display the picture 12 in the second preset region 23.

For example, in the embodiments of this application, in a case that M is greater than two, the electronic device displays the picture indicated by the another target identifier in the first preset region, and displays, in the second preset region, M−1 pictures indicated by identifiers other than the another target identifier in the M target identifiers.

For example, in the embodiments of this application, the user triggers, through an input, the electronic device to display, in the first preset region, any of the M−1 pictures indicated by the identifiers other than the another target identifier in the M target identifiers, and display the picture indicated by the another target identifier in the second preset region.

Figure 7B:
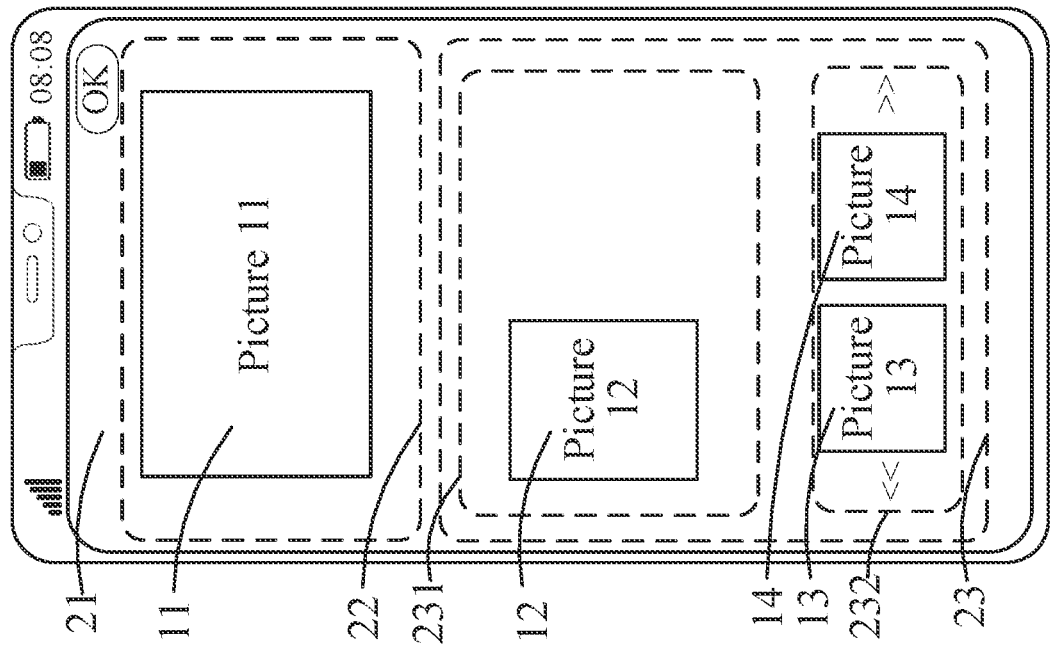
FIG. 7A and FIG. 7B illustrate a fourth schematic diagram of an example of a mobile phone interface according to embodiments of this application.
Figure 7A:
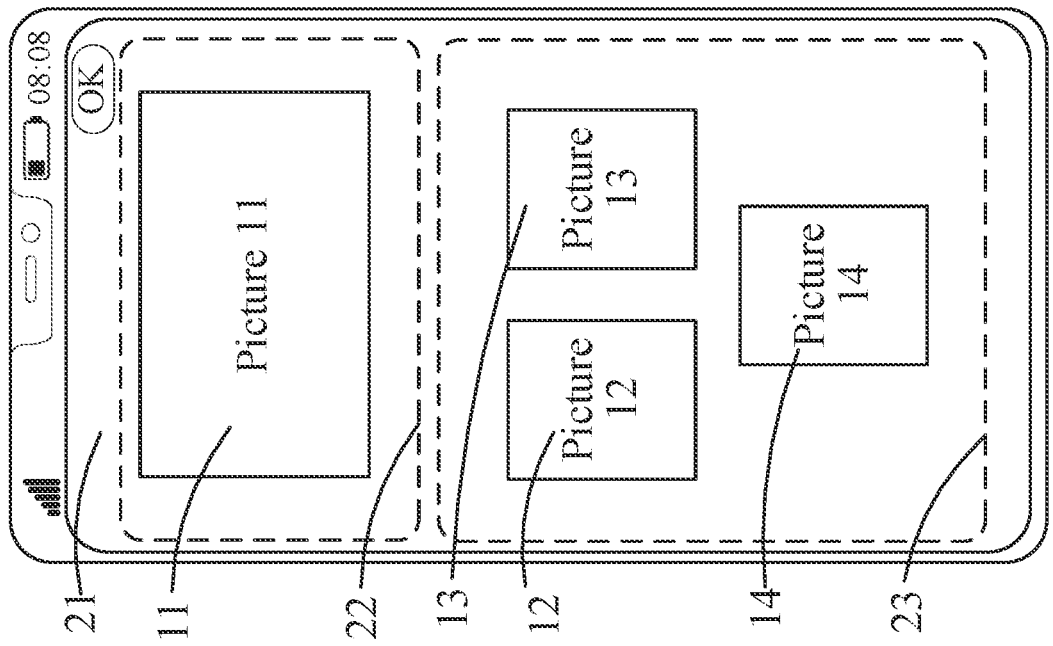

Exemplarily, with reference to FIG. 3B and FIG. 7A, the mobile phone updates the picture thumbnail display interface 10 to a picture editing interface 21. The picture editing interface 21 includes a first preset region 22 and a second preset region 23. The mobile phone displays the picture 11 in the first preset region 22 and displays the picture 12, picture 13, and picture 14 in the second preset region 23.

For example, in the embodiments of this application, the second preset region includes a first sub-region and a second sub-region. "Displaying pictures indicated by other target identifiers in the second preset region" in step 202b above may be implemented by step 202b1 below.

Step 202b1: The electronic device displays the picture indicated by the another target identifier in the first preset region, displays the picture indicated by the one target identifier in the first sub-region, and displays, in the second sub-region, pictures indicated by identifiers other than the one target identifier in the other target identifiers.

For example, in the embodiments of this application, in a case that M is greater than two, the second preset region includes a first sub-region and a second sub-region. The first sub-region is used for displaying one picture in the M−1 pictures in sequence, and the second sub-region is used for displaying M−2 pictures other than the one picture displayed in the first sub-region among the M−1 pictures.

The one picture displayed in the first sub-region and the M−2 pictures displayed in the second sub-region are all pictures in the M−1 pictures.

Exemplarily, with reference to FIG. 3B and FIG. 7B, the mobile phone updates the picture thumbnail display interface 10 to a picture editing interface 21. The picture editing interface 21 includes a first preset region 22 and a second preset region 23. The second preset region 23 includes a first sub-region 231 and a second sub-region 232. The mobile phone displays the picture 11 in the first preset region 22, displays the picture 12 in the first sub-region 231, and displays the picture 13 and the picture 14 in the second sub-region 232.

In the embodiments of this application, the electronic device may determine the picture indicated by the another target identifier as a pinned-to-top picture and display the picture in the first preset region, and display, in the second preset region, pictures indicated by target identifiers other than the another target identifier in the M target identifiers, so that the user can perform an input on the pictures, and the electronic device can perform synthesis processing on the pictures.

Step 203. The electronic device receives a second input by the user for the M pictures.

For example, in the embodiments of this application, the user can trigger, through an input, the electronic device to adjust the display position and display size of each of the M pictures in sequence, so as to combine the M pictures.

Step 204: The electronic device performs, in response to the second input, synthesis processing on the M pictures according to a size of each of the M pictures to obtain a target synthesized picture.

For example, in the embodiments of this application, the synthesis processing includes at least one of the following: cropping the pictures, adjusting the sizes of the pictures, and stitching the pictures.

For example, in the embodiments of this application, in a case that M is equal to two, the user drags the picture indicated by the one target identifier displayed in the second preset region to the position of the picture indicated by the another target identifier displayed in the first preset region, so as to combine the picture indicated by the one target identifier and the picture indicated by the another target identifier. Then, the user performs an input on the determining control to trigger the electronic device to perform synthesis processing on the picture indicated by the one target identifier and the picture indicated by the another target identifier, so as to obtain a target synthesized picture.

For example, in the embodiments of this application, the combination of the picture indicated by the one target identifier and the picture indicated by the another target identifier includes any of the following: the distance between one picture (such as the picture indicated by the one target identifier) and another picture (such as the picture indicated by the another target identifier) is greater than 0 (that is, the two pictures are not in contact), the distance between the one picture and the another picture is equal to 0 (that is, edge lines of the two pictures coincide, but there is no overlap region between the two pictures), and there is an overlap region between the one picture and the another picture.

Figure 8:
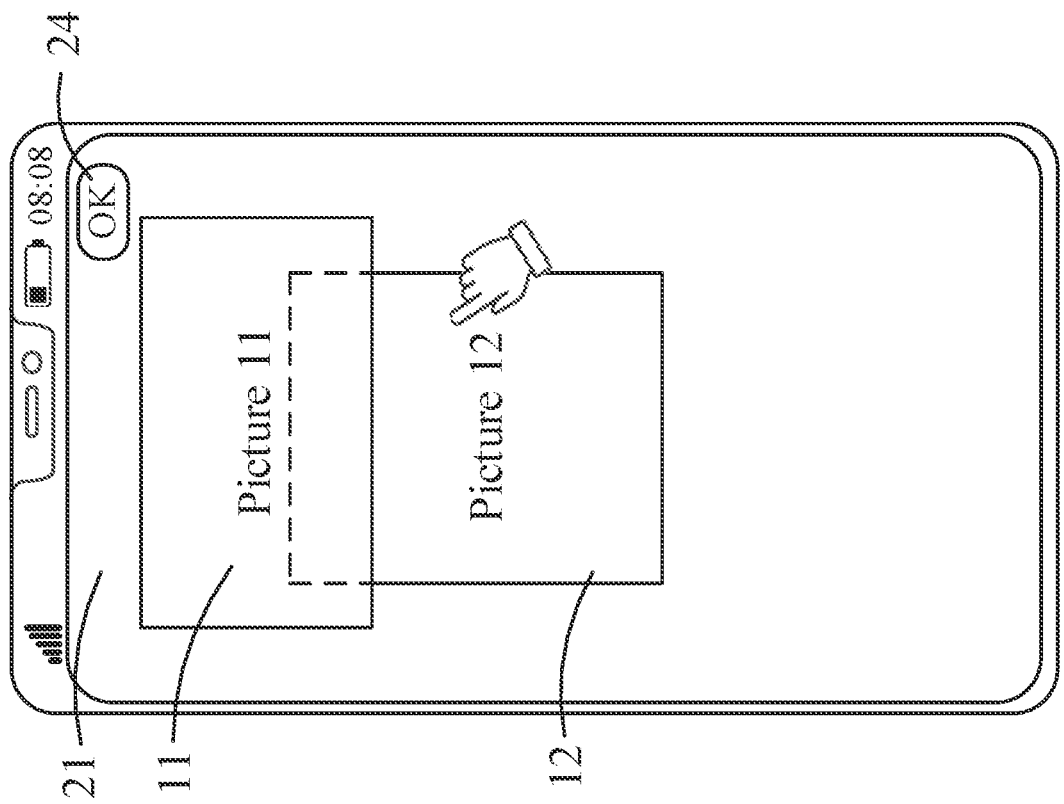
FIG. 8 is a fifth schematic diagram of an example of a mobile phone interface according to embodiments of this application.

Exemplarily, with reference to FIG. 6 and FIG. 8, the user performs a drag input on the picture 12 to drag the picture 12 to a position where the picture 12 has an overlap region with the picture 11, and then the user performs an input on the determining control 24 to trigger the mobile phone to perform synthesis processing on the picture 11 and the picture 12, so as to obtain a target synthesized picture.

For example, in the embodiments of this application, in a case that M is greater than two, the user sequentially drags the M−1 pictures displayed in the second preset region to the position of the picture indicated by the another target identifier displayed in the first preset region, so as to combine the M−1 pictures and the picture indicated by the another target identifier. Then, the user performs an input on the determining control to trigger the electronic device to perform synthesis processing on the M−1 pictures and the picture indicated by the another target identifier, so as to obtain a target synthesized picture.

Figure 9:
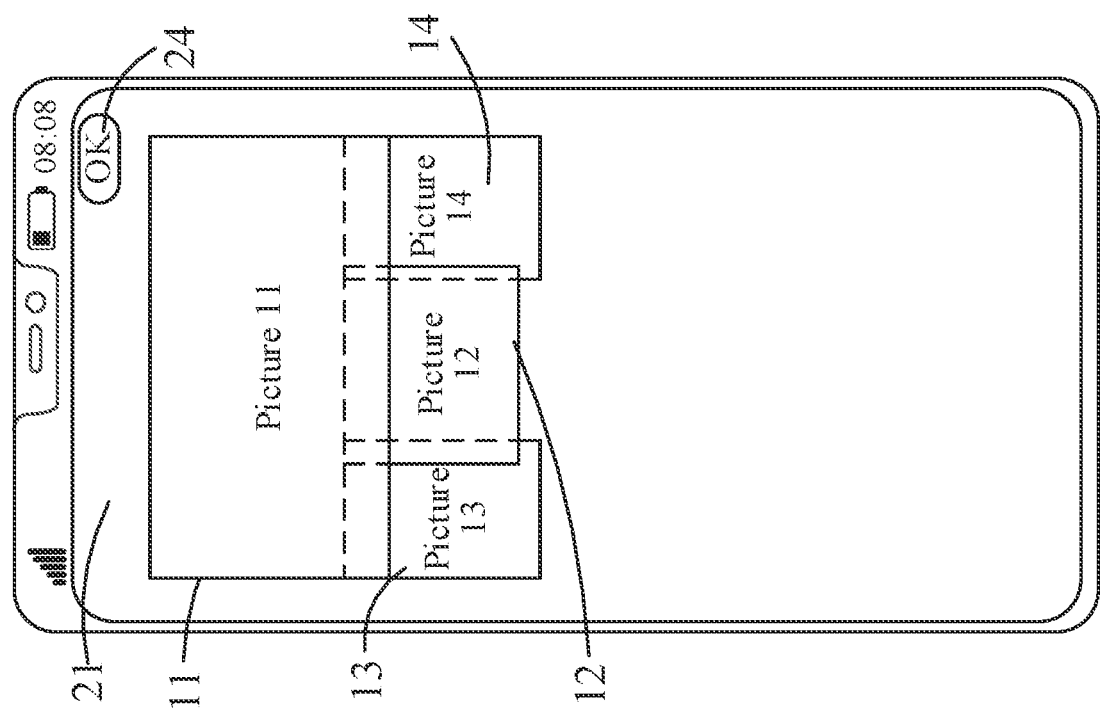
FIG. 9 is a sixth schematic diagram of an example of a mobile phone interface according to embodiments of this application.

Exemplarily, with reference to FIG. 7A and FIG. 9, the user sequentially performs drag inputs on the picture 12, the picture 13, and the picture 14 to drag the picture 12, the picture 13, and the picture 14 to the position of the picture 11, and then the user performs an input on the determining control 24 to trigger the mobile phone to perform synthesis processing on the picture 11, the picture 12, the picture 13, and the picture 14, so as to obtain a target synthesized picture.

For example, in the embodiments of this application, in a case that M is greater than two and the second preset region includes a first sub-region and a second sub-region, the user drags one picture in the M−1 pictures displayed in the first sub-region to the position of the picture indicated by another target identifier displayed in the first preset region, so that the one picture is combined with the picture indicated by the another target identifier, and then the user performs an input on the determining control to trigger the electronic device to perform synthesis processing on the one picture and the picture indicated by the another target identifier, to obtain a synthesized picture. Then, the user performs an input on another picture in the M−2 pictures displayed in the second sub-region so that the electronic device displays the another picture in the first sub-region, the user drags the another picture displayed in the first sub-region to the position of the above-mentioned synthesized picture so that the another picture and the synthesized picture are combined, and then the user performs an input on the determining control to trigger the electronic device to perform synthesis processing on the another picture and the synthesized picture, so as to obtain another synthesized picture. And so on, until the user performs inputs on all M−2 pictures displayed in the second sub-region, so as to trigger the electronic device to perform synthesis processing on the M pictures to obtain a target synthesized picture.

Figure 10:
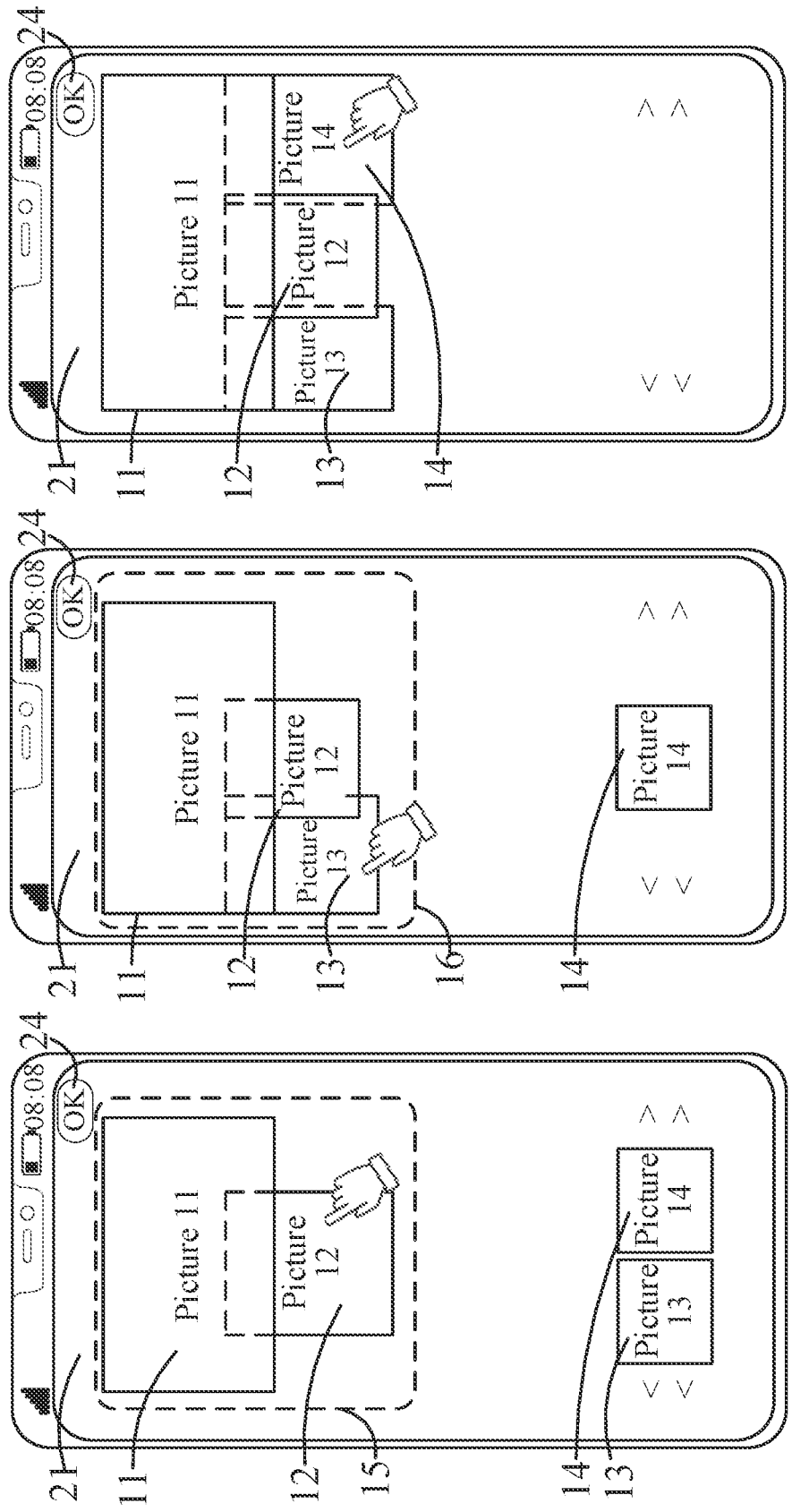
FIGS. 10A-10C illustrate a seventh schematic diagram of an example of a mobile phone interface according to embodiments of this application.

Exemplarily, with reference to FIG. 7B and FIG. 10A, the user performs a drag input on the picture 12 to drag the picture 12 to the position of the picture 11, and then the user performs an input on the determining control 24 to trigger the mobile phone to perform synthesis processing on the picture 11 and the picture 12, so as to obtain a synthesized picture 15 (i.e., a combined picture of the picture 11 and the picture 12). With reference FIG. 10B, the user then performs a drag input on a picture 13 to drag the picture 13 to the position of the synthesized picture 15, and then the user performs an input on the determining control 24 again to trigger the mobile phone to perform synthesis processing on the picture 13 and the synthesized picture 15, so as to obtain a synthesized picture 16 (i.e., a combined picture of the picture 11, picture 12 and picture 13). With reference to FIG. 10C, the user then performs a drag input on a picture 14 to drag the picture 14 to the position of the synthesized picture 16, and then the user performs an input on the determining control 24 again to trigger the mobile phone to perform synthesis processing on the picture 14 and the synthesized picture 16, so as to obtain a target synthesized picture (i.e., a combined picture of the picture 11, picture 12, picture 13, and picture 14).

The embodiments of this application provide a picture processing method. When an electronic device displays a first interface, a user can perform an input on M target identifiers in N target identifiers displayed in the first interface to trigger the electronic device to update the first interface to a second interface, so that the user can perform a second input on M pictures indicated by the M target identifiers displayed in the second interface, and the electronic device can perform synthesis processing on the M pictures according to the size of each picture in the M pictures, to obtain a target synthesized picture. When the user needs to perform synthesis processing on multiple pictures through the electronic device, the user can perform, in an interface that includes identifiers corresponding to the multiple pictures and is displayed by the electronic device, an input on the identifiers corresponding to the multiple pictures, so that the electronic device can display another interface including these pictures. The user can perform an input on the pictures in the another interface, so that the electronic device can adjust the display position and display size of each of the pictures according to the input by the user, and perform synthesis processing on the pictures according to the size of each of the pictures to obtain a target synthesized picture. There is no need for the user to first edit each of the pictures separately through the electronic device to obtain a picture of a size required for picture synthesis, and then perform synthesis processing on the edited pictures to obtain a synthesized picture. Therefore, user operations are reduced, thereby improving the efficiency of obtaining a synthesized picture through processing by an electronic device.

Figure 11:
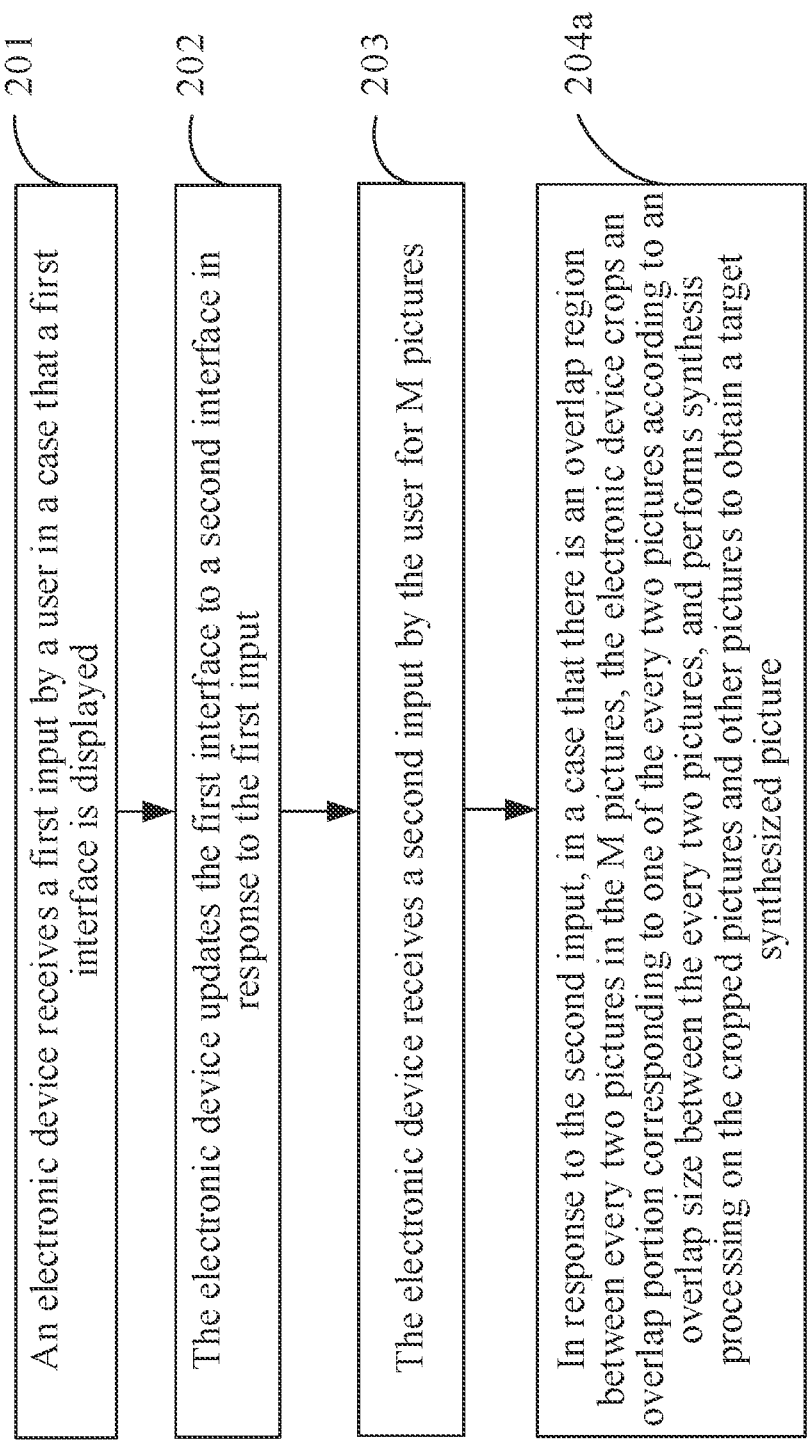
FIG. 11 is a fourth schematic diagram of a picture processing method according to embodiments of this application.

For example, in the embodiments of this application, the second input is a sequential drag input by the user for M−1 pictures in the M pictures. With reference to FIG. 1 and FIG. 11, step 204 above can be implemented by step 204a below.

Step 204a: In response to the second input, in a case that there is an overlap region between every two pictures in the M pictures, the electronic device crops an overlap portion corresponding to one of the every two pictures according to an overlap size between the every two pictures, and performs synthesis processing on the cropped pictures and other pictures to obtain the target synthesized picture.

For example, in the embodiments of this application, the other pictures are pictures other than the cropped pictures in the M pictures For example, in the embodiments of this application, that the overlap size is greater than a second preset threshold may be understood as: the area of the overlap region between the two pictures is greater than a second preset area, or, the ratio of the area of the overlap region between the two pictures to the area of any one of the two pictures is greater than a third preset ratio.

For example, in the embodiments of this application, the electronic device crops the occluded portion of the occluded one of any two pictures according to the overlap size of the overlap region between the any two pictures.

According to the second input by the user, the electronic device may crop some or all of the M pictures. The specific cropping of the pictures depends on actual situations, and is not limited in this application.

For example, in the embodiments of this application, the electronic device stitches the cropped pictures and the uncropped pictures in the M pictures to obtain a target synthesized picture.

In the embodiments of this application, the electronic device can simultaneously crop the pictures that need to be cropped in the M pictures, and stitch the cropped pictures and the uncropped pictures in the M pictures to obtain a target synthesized picture. Thus, the efficiency of obtaining a synthesized picture through processing by an electronic device can be improved.

Figure 12:
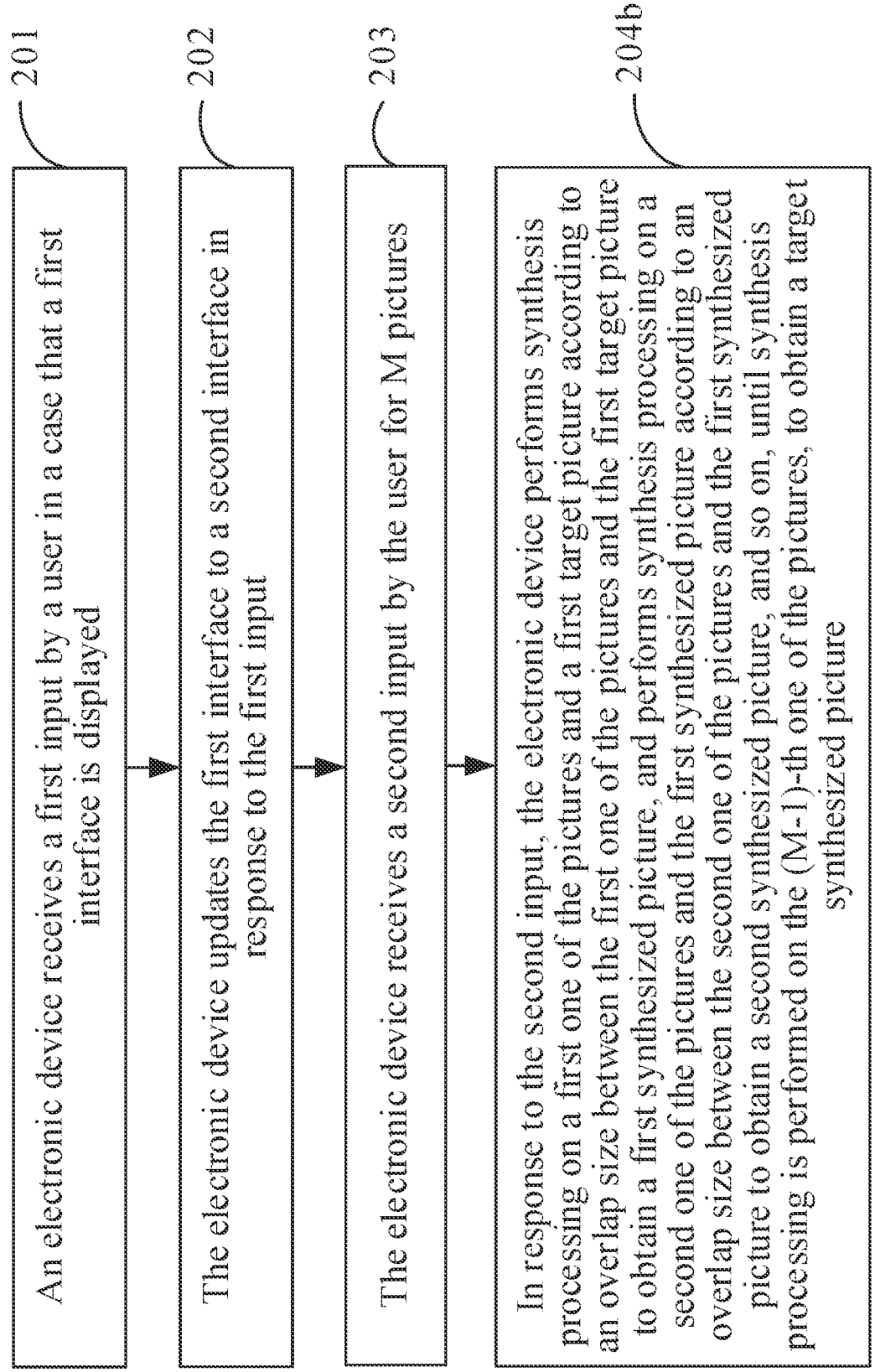
FIG. 12 is a fifth schematic diagram of a picture processing method according to embodiments of this application.

For example, in the embodiments of this application, the second input includes M−1 sub-inputs, each sub-input is a drag input by the user for a picture in the M−1 pictures, and the M−1 pictures are pictures in the M pictures. With reference to FIG. 1 and FIG. 12, step 204 above can be implemented by step 204b below.

Step 204b: In response to the second input, the electronic device performs synthesis processing on a first one of the pictures and a first target picture according to an overlap size between the first one of the pictures and the first target picture to obtain a first synthesized picture, and performs synthesis processing on a second one of the pictures and the first synthesized picture according to an overlap size between the second one of the pictures and the first synthesized picture to obtain a second synthesized picture, and so on, until synthesis processing is performed on an $(M-1)^{th}$ one of the pictures, to obtain the target synthesized picture.

For example, in the embodiments of this application, the first one of the pictures, the second one of the pictures, and the $(M-1)^{th}$ one of the pictures are all pictures in the M−1 pictures, and the first target picture is a picture other than the M−1 pictures in the M pictures.

For example, in the embodiments of this application, the performing synthesis processing on a first one of the pictures and a first target picture according to an overlap size between the first one of the pictures and the first target picture to obtain a first synthesized picture includes: in a case that there is an overlap region between the first one of the pictures and the first target picture, cropping the first one of the pictures according to the overlap size between the first one of the pictures and the first target picture, and performing synthesis processing on the first one of the pictures which is cropped and the first target picture to obtain a first synthesized picture; and in a case that there is no overlap region between the first one of the pictures and the first target picture, performing, by the electronic device, synthesis processing on the first one of the pictures and the first target picture to obtain a first synthesized picture.

For example, in the embodiments of this application, the performing synthesis processing on a second one of the pictures and the first synthesized picture according to an overlap size between the second one of the pictures and the first synthesized picture to obtain a second synthesized picture includes: in a case that there is an overlap region between the second one of the pictures and the first synthesized picture, cropping the second one of the pictures according to the overlap size between the second one of the pictures and the first synthesized picture, and performing synthesis processing on the second one of the pictures which is cropped and the first synthesized picture to obtain a second synthesized picture; and in a case that there is no overlap region between the second one of the pictures and the first synthesized picture, performing, by the electronic device, synthesis processing on the second one of the pictures and the first synthesized picture to obtain a second synthesized picture.

And so on, until synthesis processing is performed on the $(M-1)^{th}$ one of the pictures to obtain a target synthesized picture.

For example, in the embodiments of this application, after the user drags a picture (such as the first one of the pictures) to the position of another picture (such as the first target picture), the user performs an input on a synthesis control, so that the electronic device performs synthesis processing on the two pictures (i.e., the first one of the pictures and the first target picture) to obtain a synthesized picture (for example, the first synthesized picture).

Each time the user drags a picture to the position of another picture, the user can perform an input on the synthesis control, so that the electronic device performs synthesis processing on the two pictures to obtain a synthesized picture, until the electronic device performs synthesis processing on the last one of the M pictures, to obtain a target synthesized picture.

In the embodiments of this application, the electronic device may, according to an input by the user, sequentially perform synthesis processing on a picture in the M pictures and the first target picture or an obtained synthesized picture, and obtain a target synthesized picture through multiple times of synthesis processing. Therefore, after synthesis processing each time, the user can view the display effect of the synthesized picture, so that the user can flexibly select pictures that need to be synthesized.

The picture processing method provided by the embodiments of this application may be executed by a picture processing apparatus, or a control module used for executing the picture processing method in the picture processing apparatus. In the embodiments of this application, the picture processing method provided by the embodiments of this application is described by taking the picture processing apparatus executing the picture processing method as an example.

For example, in the embodiments of this application, the "performing synthesis processing on a first one of the pictures and a first target picture according to an overlap size between the first one of the pictures and the first target picture" in step 204b above can be implemented by step 204b1 or 204b2 below.

Step 204b1: In a case that there is no overlap region between the first one of the pictures and the first target picture, the electronic device crops the first one of the pictures or the first target picture according to a width value of the first one of the pictures or a width value of the first target picture, and performs synthesis processing on the cropped picture and the uncropped picture.

That there is no overlap region between the first one of the pictures and the first target picture can be understood as: the first one of the pictures is adjacent to the first target picture, and an edge line of the first one of the pictures coincides with an edge line of the first target picture.

The width value of the first one of the pictures and the width value of the first target picture are width values in the same direction, and the width value of the first one of the pictures and the width value of the first target picture are width values in a direction determined by the user.

For example, in the embodiments of this application, in a case that there is no overlap region between the first one of the pictures and the first target picture, the electronic device crops the picture having a great width value in the first one of the pictures and the first target picture according to the width value of the picture having a small width value in the first one of the pictures and the first target picture, so that a rectangular picture can be obtained after synthesis processing is performed on the cropped picture and the uncropped picture.

Figure 13B:
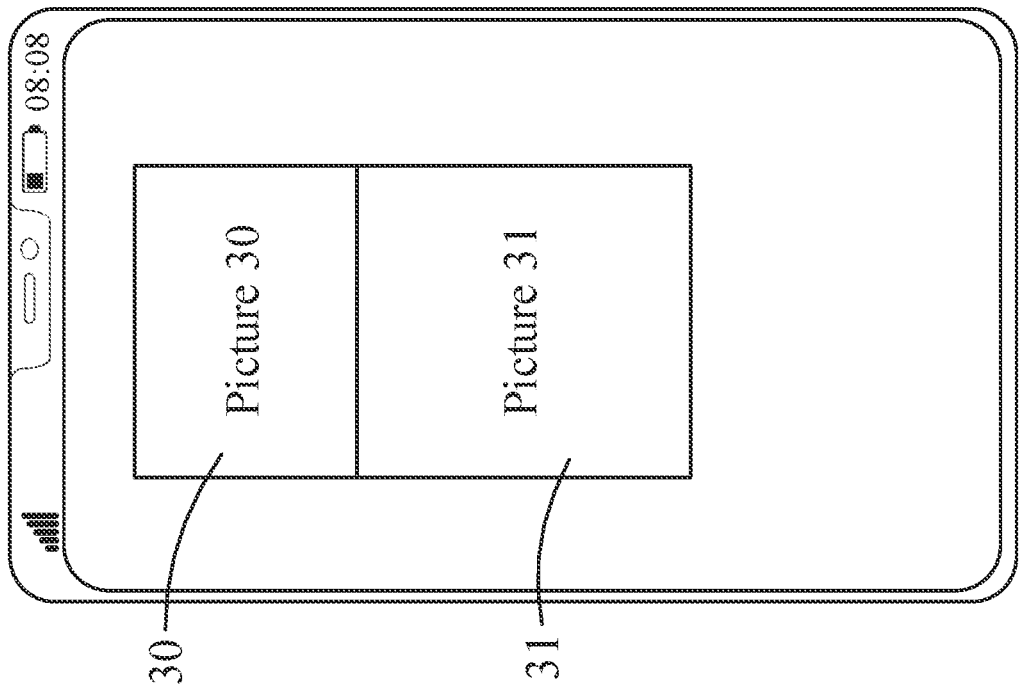
FIG. 13A and FIG. 13B illustrate an eighth schematic diagram of an example of a mobile phone interface according to embodiments of this application.
Figure 13A:
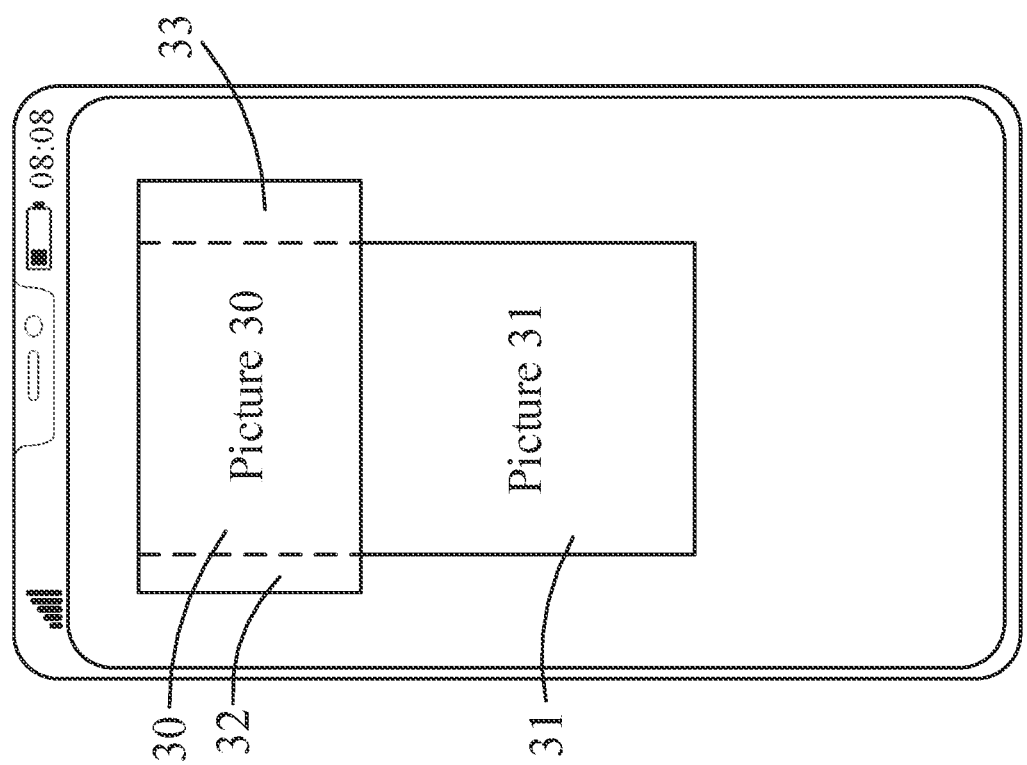

Exemplarily, with reference to FIG. 6 and FIG. 13A, a schematic diagram of picture cropping according to the embodiments of this application is shown. There is no overlap region between the first one 30 of the pictures and the first target picture 31, and the width value of the first one 30 of the pictures is greater than that of the first target picture 31. The mobile phone crops the first one 30 of the pictures to remove a region 32 and a region 33 in the first one 30 of the pictures. With reference to FIG. 13B, a picture obtained by performing synthesis processing on the first one 30 of the pictures and the first target picture 31 after the cropping is shown.

Step 204b2: In a case that there is an overlap region between the first one of the pictures and the first target picture, the electronic device crops at least one of the first one of the pictures and the first target picture according to a width value of the overlap region, and performs synthesis processing based on the cropped picture.

For example, in the embodiments of this application, in a case that there is an overlap region between the first one of the pictures and the first target picture, and the width value of the first one of the pictures and the width value of the first target picture are both greater than the width value of the overlap region, the region outside the width value of the overlap region in the first one of the pictures, the region outside the width value of the overlap region in the first target picture, and the overlap region of the pinned-to-bottom picture in the first one of the pictures and the first target picture (i.e., the picture other than the pinned-to-top picture) are removed by cropping. Or, one width value in the width value of the first one of the pictures and the width value of the first target picture is greater than the width value of the overlap region, and the other width value is equal to the width value of the overlap region, the region outside the width value of the overlap region in the picture having the width value greater than the width value of the overlap region, and the overlap region of the pinned-to-bottom picture in the first one of the pictures and the first target picture (i.e., the picture other than the pinned-to-top picture) are removed by cropping.

Exemplarily, with reference to FIG. 6 and FIG. 14A, another schematic diagram of picture cropping according to the embodiments of this application is shown. There is an overlap region 34 (indicated by black filling in the drawing) between the first one 30 of the pictures and the first target picture 31, the first one 30 of the pictures is a pinned-to-top picture, and the width value of the first one 30 of the pictures and the width value of the first target picture 31 are both greater than the width value of the overlap region 34. The mobile phone crops the first one 30 of the pictures and the first target picture 31 to remove a region 35 in the first one 30 of the pictures, the overlap region 34 in the first one 30 of the pictures, and a region 36 in the first target picture 31. With reference FIG. 14B, a picture obtained by performing synthesis processing on the first one 30 of the pictures and the first target picture 31 after the cropping is shown.

Figure 15:
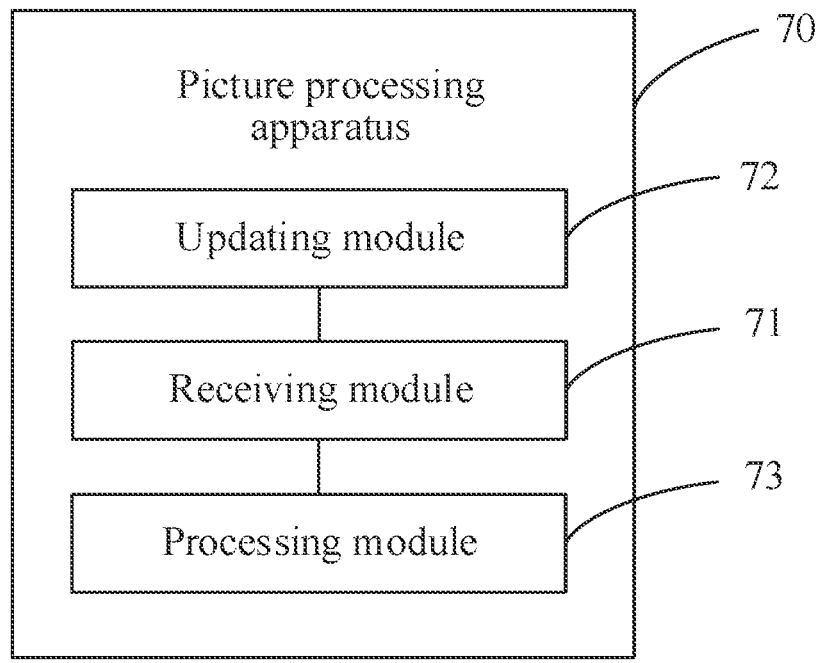
FIG. 15 is a first schematic structural diagram of a picture processing apparatus according to embodiments of this application.

FIG. 15 is a possible schematic structural diagram of a picture processing apparatus involved in the embodiments of this application. As shown in FIG. 15, the picture processing apparatus 70 includes a receiving module 71, an updating module 72, and a processing module 73.

The receiving module 71 is configured to receive a first input by a user in a case that a first interface is displayed. The first interface includes N target identifiers, each target identifier indicates a picture respectively, the first input is an input by the user for M target identifiers in the N target identifiers, N and M are both integers greater than 1, and M is less than or equal to N. The updating module 72 is configured to update the first interface to a second interface in response to the first input received by the receiving module 71. The second interface includes M pictures indicated by the M target identifiers. The receiving module 71 is further configured to receive a second input by the user for the M pictures. The processing module 73 is configured to, in response to the second input received by the receiving module 71, perform synthesis processing on the M pictures according to a size of each of the M pictures to obtain a target synthesized picture.

In a possible implementation, in a case that M is equal to two, the first input is an input by the user dragging one target identifier to another target identifier. In a case that M is greater than two, the first input includes a first sub-input and a second sub-input. The first sub-input is a selection input by the user for the M target identifiers, and the second sub-input is an input by the user dragging one target identifier in the M target identifiers to another target identifier in the M target identifiers. Or, the first sub-input is a selection input by the user for M−1 target identifiers in the N target identifiers, and the second sub-input is an input by the user dragging one target identifier in the M−1 target identifiers to another target identifier, or, the second sub-input is an input by the user dragging another target identifier to one target identifier in the M−1 target identifiers: and the another target identifier is an identifier other than the M−1 target identifiers in the N target identifiers.

In a possible implementation, the updating module 72 is configured to update the first interface to the second interface in a case that an overlap size between the one target identifier and the another target identifier is greater than or equal to a first preset threshold.

Figure 16:
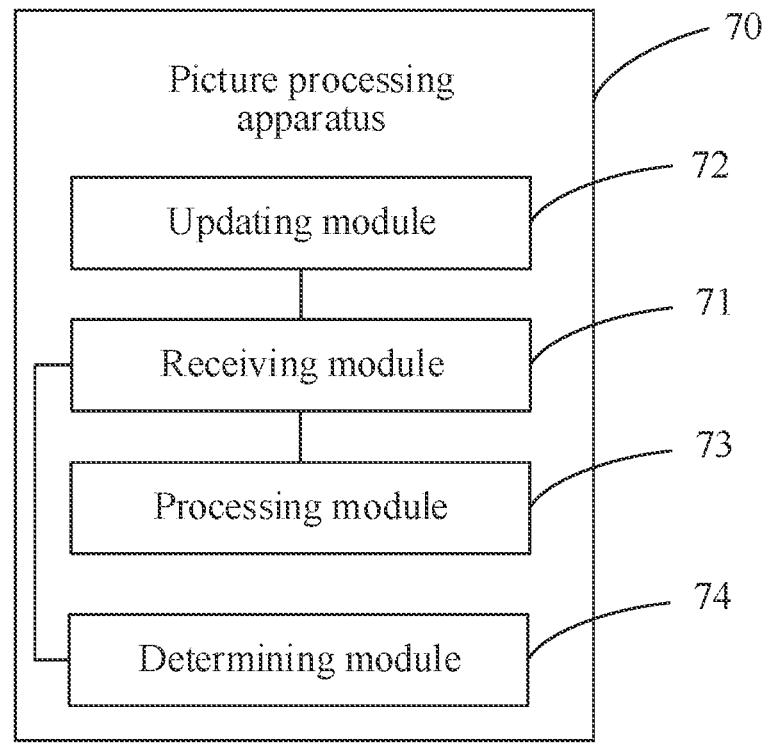
FIG. 16 is a second schematic structural diagram of a picture processing apparatus according to embodiments of this application.

In a possible implementation, the second interface includes a first preset region and a second preset region. The first preset region is configured to display a pinned-to-top picture, and in a case that any picture has an overlap region with the pinned-to-top picture, the pinned-to-top picture covers the any picture in the overlap region. As shown in FIG. 15 and FIG. 16, the picture processing apparatus 70 according to the embodiments of this application may further include a determining module 74. The determining module 74 is configured to determine a picture indicated by the another target identifier as the pinned-to-top picture before the updating module 72 updates the first interface to the second interface. The updating module 72 is configured to display the picture indicated by the another target identifier in the first preset region, and display pictures indicated by other target identifiers in the second preset region. The other target identifiers are identifiers other than the another target identifier in the M target identifiers.

In a possible implementation, the second preset region includes a first sub-region and a second sub-region. The updating module 72 is configured to display a picture indicated by the one target identifier in the first sub-region, and display, in the second sub-region, pictures indicated by identifiers other than the one target identifier in the other target identifiers.

In a possible implementation, the second input is a sequential drag input by the user for M−1 pictures in the M pictures. The processing module 73 is configured to, in a case that there is an overlap region between every two pictures in the M pictures, crop an overlap portion corresponding to one of the every two pictures according to an overlap size between the every two pictures, and perform synthesis processing on the cropped pictures and other pictures to obtain the target synthesized picture. The other pictures are pictures other than the cropped pictures in the M pictures.

In a possible implementation, the second input includes M−1 sub-inputs, each sub-input is a drag input by the user for a picture in the M−1 pictures, and the M−1 pictures are pictures in the M pictures. The processing module 73 is configured to: perform synthesis processing on a first one of the pictures and a first target picture according to an overlap size between the first one of the pictures and the first target picture to obtain a first synthesized picture: and perform synthesis processing on a second one of the pictures and the first synthesized picture according to an overlap size between the second one of the pictures and the first synthesized picture to obtain a second synthesized picture, and so on, until synthesis processing is performed on an $(M-1)^h$ one of the pictures, to obtain the target synthesized picture. The first one of the pictures, the second one of the pictures, and the $(M-1)^h$ one of the pictures are all pictures in the M−1 pictures, and the first target picture is a picture other than the M−1 pictures in the M pictures.

In a possible implementation, the processing module 73 is configured to: in a case that there is no overlap region between the first one of the pictures and the first target picture, crop the first one of the pictures or the first target picture according to a width value of the first one of the pictures or a width value of the first target picture, and perform synthesis processing on the cropped picture and uncropped picture; or in a case that there is an overlap region between the first one of the pictures and the first target picture, crop at least one of the first one of the pictures and the first target picture according to a width value of the overlap region, and perform synthesis processing based on the cropped picture.

The picture processing apparatus provided in the embodiments of this application can implement processes implemented by the picture processing apparatus in the foregoing method embodiments. To avoid repetition, detailed description is not repeated here.

The picture processing apparatus in the embodiments of this application may be an apparatus, and may also be a component, an integrated circuit, or a chip in the picture processing apparatus. The apparatus may be a mobile electronic device or a non-mobile electronic device. Exemplarily, the mobile electronic device may be a mobile phone, a tablet computer, a laptop, a palmtop computer, an in-vehicle electronic device, a wearable device, an Ultra-Mobile Personal Computer (UMPC), a netbook, or a Personal Digital Assistant (PDA), and the non-mobile electronic device may be a server, a Network Attached Storage (NAS), a Personal Computer (PC), a Television (TV), an automated teller machine or a self-service kiosk, which are not limited in the embodiments of this application.

The picture processing apparatus in the embodiments of this application may be an apparatus having an operating system. The operating system may be an Android operating system, an ios operating system, or other possible operating systems, which are not limited in the embodiments of this application.

The embodiments of this application provide a picture processing apparatus. When the user needs to perform synthesis processing on multiple pictures through the picture processing apparatus, the user can perform, in an interface that includes identifiers corresponding to the multiple pictures and is displayed by the picture processing apparatus, an input on the identifiers corresponding to the multiple pictures, so that the picture processing apparatus can display another interface including these pictures. The user can perform an input on the pictures in the another interface, so that the picture processing apparatus can adjust the display position and display size of each of the pictures according to the input by the user, and perform synthesis processing on the pictures according to the size of each of the pictures to obtain a target synthesized picture. There is no need for the user to first edit each of the pictures separately through the picture processing apparatus to obtain a picture of a size required for picture synthesis, and then perform synthesis processing on the edited pictures to obtain a synthesized picture. Therefore, user operations are reduced, thereby improving the efficiency of obtaining a synthesized picture through processing by the picture processing apparatus.

For example, the embodiments of this application further provide an electronic device, including a processor, a memory, and a program or instruction that is stored on the memory and executable on the processor. The program or instruction, when executed by the processor, implements processes of the foregoing picture processing method embodiments. Moreover, the same technical effect can be achieved. To avoid repetition, details are not described here again.

The electronic device in the embodiments of this application includes the foregoing mobile electronic device and non-mobile electronic device.

Figure 17:
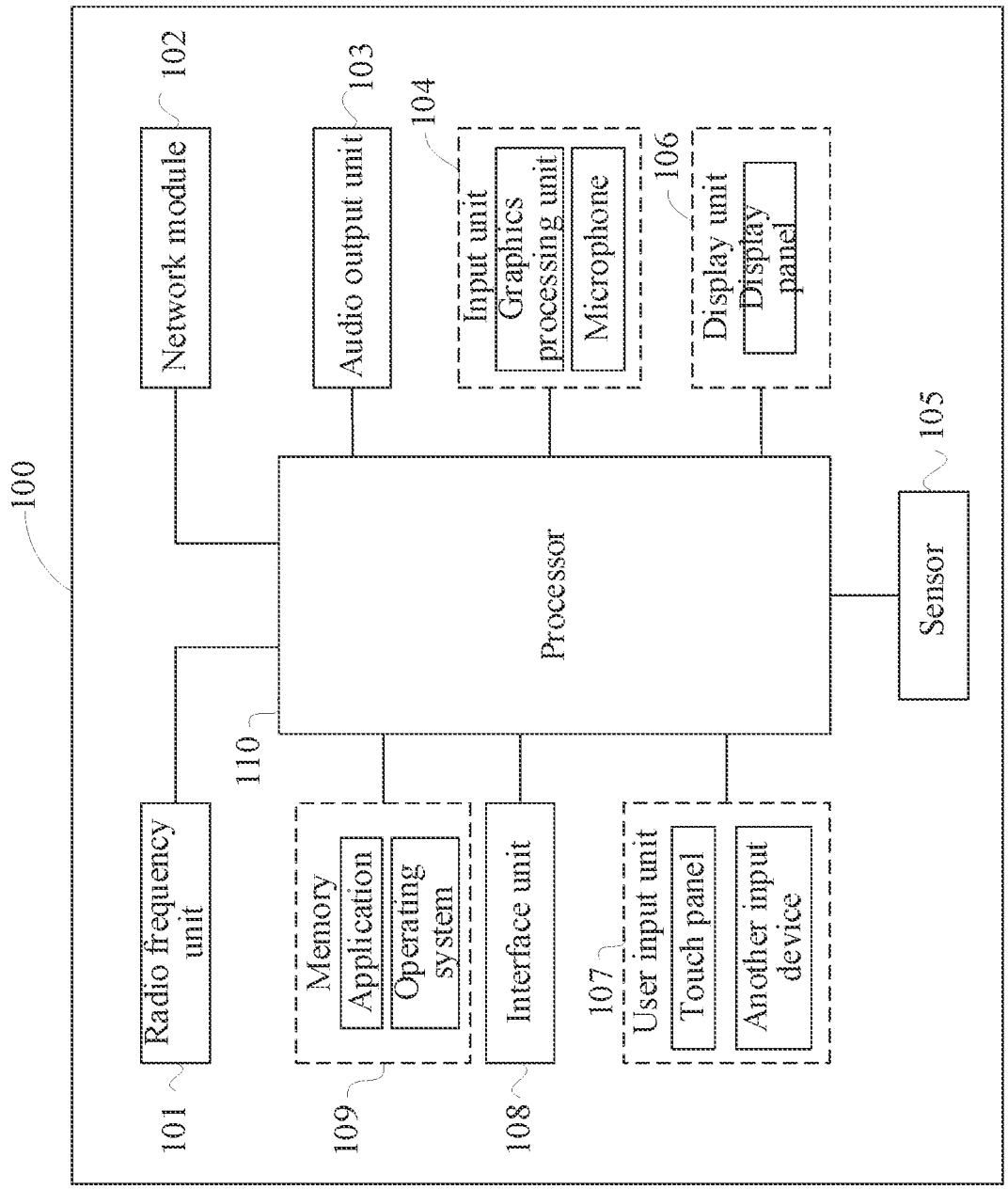
FIG. 17 is a schematic diagram of a hardware structure of an electronic device according to embodiments of this application.

FIG. 17 is a schematic diagram of a hardware structure of an electronic device for implementing the embodiments of this application.

The electronic device 100 includes, but is not limited to, components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the electronic device 100 may further include a power supply (such as a battery) for supplying power to the components, and the power supply may be logically connected to the processor 110 through a power management system, so that functions such as charging/discharging management and power consumption management can be implemented through the power management system. The structure of the electronic device shown in FIG. 17 does not constitute a limitation to the electronic device. The electronic device may include components more or fewer than those shown in the drawing, or a combination of some components, or different component layouts, which will not be repeated here.

The user input unit 107 is configured to receive a first input by a user in a case that a first interface is displayed. The first interface includes N target identifiers, each target identifier indicates a picture respectively, the first input is an input by the user for M target identifiers in the N target identifiers, N and M are both integers greater than 1, and M is less than or equal to N.

The display unit 106 is configured to update the first interface to a second interface in response to the first input. The second interface includes M pictures indicated by the M target identifiers.

The user input unit 107 is further configured to receive a second input by the user for the M pictures.

The processor 110 is configured to, in response to the second input, perform synthesis processing on the M pictures according to a size of each of the M pictures to obtain a target synthesized picture.

The embodiments of this application provide an electronic device. When the user needs to perform synthesis processing on multiple pictures through the electronic device, the user can perform, in an interface that includes identifiers corresponding to the multiple pictures and is displayed by the electronic device, an input on the identifiers corresponding to the multiple pictures, so that the electronic device can display another interface including these pictures. The user can perform an input on the pictures in the another interface, so that the electronic device can adjust the display position and display size of each of the pictures according to the input by the user, and perform synthesis processing on the pictures according to the size of each of the pictures to obtain a target synthesized picture. There is no need for the user to first edit each of the pictures separately through the electronic device to obtain a picture of a size required for picture synthesis, and then perform synthesis processing on the edited pictures to obtain a synthesized picture. Therefore, user operations are reduced, thereby improving the efficiency of obtaining a synthesized picture through processing by the electronic device.

For example, the display unit 106 is further configured to update the first interface to the second interface in a case that an overlap size between one target identifier and another target identifier is greater than or equal to a first preset threshold.

The processor 110 is further configured to determine a picture indicated by the another target identifier as a pinned-to-top picture before updating the first interface to the second interface.

The display unit 106 is further configured to display the picture indicated by the another target identifier in a first preset region, and display pictures indicated by other target identifiers in a second preset region. The other target identifiers are identifiers other than the another target identifier in the M target identifiers.

The display unit 106 is further configured to display a picture indicated by the one target identifier in a first sub-region, and display, in a second sub-region, pictures indicated by identifiers other than the one target identifier in the other target identifiers.

The processor 110 is further configured to, in a case that there is an overlap region between every two pictures in the M pictures, crop an overlap portion corresponding to one of the every two pictures according to an overlap size between the every two pictures, and perform synthesis processing on the cropped pictures and other pictures to obtain the target synthesized picture. The other pictures are pictures other than the cropped pictures in the M pictures.

The processor 110 is further configured to: perform synthesis processing on a first one of the pictures and a first target picture according to an overlap size between the first one of the pictures and the first target picture to obtain a first synthesized picture; and perform synthesis processing on a second one of the pictures and the first synthesized picture according to an overlap size between the second one of the pictures and the first synthesized picture to obtain a second synthesized picture, and so on, until synthesis processing is performed on an $(M-1)^h$ one of the pictures, to obtain the target synthesized picture.

The processor 110 is further configured to: in a case that there is no overlap region between the first one of the pictures and the first target picture, crop the first one of the pictures or the first target picture according to a width value of the first one of the pictures or a width value of the first target picture, and perform synthesis processing on the cropped picture and uncropped picture; or in a case that there is an overlap region between the first one of the pictures and the first target picture, crop at least one of the first one of the pictures and the first target picture according to a width value of the overlap region, and perform synthesis processing based on the cropped picture.

The embodiments of this application further provide a readable storage medium, having a program or instruction stored thereon. The program or instruction, when executed by a processor, implements the processes of the foregoing picture processing method embodiments. Moreover, the same technical effect can be achieved. To avoid repetition, details are not described here again.

The processor is the processor in the electronic device described in the above embodiments. The readable storage medium includes a computer-readable storage medium, such as a computer Read-Only Memory (ROM), a Random Access Memory (RAM), a floppy disk, or an optical disc.

The embodiments of this application further provide a chip, including a processor and a communication interface. The communication interface is coupled to the processor, and the processor is configured to execute a program or instruction to implement processes of the foregoing picture processing method embodiments. Moreover, the same technical effect can be achieved. To avoid repetition, details are not described here again.

It is to be understood that the chip mentioned in the embodiments of this application may also be referred to as a system-on-chip or a system-on-a-chip.

As used herein, the terms "comprise", "include" or any other variations thereof are intended to encompass a non-exclusive inclusion such that a process, method, item, or apparatus including a series of elements includes not only these elements, and also includes other elements not expressly listed or inherent to such a process, method, item, or apparatus. Without further limitation, an element defined by the phrase "including a . . . " does not preclude the presence of additional identical elements in a process, method, item, or apparatus that includes the element. The scope of the method and apparatus in the implementations of this application is not limited to performing the functions in the order shown or discussed, but may also include performing the functions in a substantially simultaneous manner or in the reverse order depending on the functions involved, for example, the method described may be performed in an order different from that described, and various steps may also be added, omitted, or combined. In addition, features described with reference to some examples may be combined in other examples.

Through the description of the foregoing implementations, a person skilled in the art can clearly know that the method according to the foregoing embodiments can be implemented by software and a necessary general-purpose hardware platform, and can also be implemented by the hardware, but in many cases, the former is a better implementation. Based on such an understanding, the technical solutions of this application or a part thereof contributing to the prior art may be essentially embodied in the form of a software product. The computer software product is stored in one storage medium (such as a ROM/RAM, a floppy disk, or an optical disc) and includes several instructions so that a terminal (which may be a mobile phone, a computer, a server, an air conditioner, a network device, and the like) implements the method according to the embodiments of this application.

The embodiments of this application are described above with reference to the accompanying drawings, but this application is not limited to the foregoing detailed implementations. The foregoing detailed implementations are only schematic but not restrictive. Under the motivation of this application, a person skilled in the art may make many forms without departing from the purpose of this application and the scope of protection of the claims, and these all fall within the scope of protection of this application.

What is claimed is:

1. A picture processing method, comprising:
receiving a first input by a user after a first interface is displayed,
wherein:
the first interface comprises N target identifiers;
each target identifier indicates a picture respectively;
the first input is an input by the user for selecting M target identifiers in the N target identifiers;
N and M are both integers greater than 1; and
M is less than or equal to N;
displaying a second interface in response to the first input, wherein the second interface comprises M pictures respectively corresponding to the M target identifiers;
receiving a second input by the user operating on the M pictures; and
in response to the second input, performing synthesis processing on the M pictures according to a size of each of the M pictures to obtain a target synthesized picture,
wherein:
when M is equal to two, the first input is an input by the user dragging one target identifier to another target identifier; or
when M is greater than two, the first input comprises a first sub-input and a second sub-input,
wherein:
the first sub-input is a selection input by the user for the M target identifiers, and the second sub-input is an input by the user dragging one target identifier in the M target identifiers to another target identifier in the M target identifiers; or
the first sub-input is a selection input by the user for M−1 target identifiers in the N target identifiers, and the second sub-input is an input by the user dragging one target identifier in the M−1 target identifiers to another target identifier, or the second sub-input is an input by the user dragging another target identifier to one target identifier in the M−1 target identifiers, wherein the another target identifier is an identifier other than the M−1 target identifiers in the N target identifiers,
wherein:
the second interface comprises a first preset region and a second preset region;
the first preset region is configured to display a pinned-to-top picture, wherein when any picture has an overlap region with the pinned-to-top picture, the pinned-to-top picture covers the any picture in the overlap region;
before updating the first interface to the second interface, the picture processing method further comprises: determining a picture corresponding to the another target identifier as the pinned-to-top picture; and
the updating the first interface to the second interface comprises:
displaying the picture corresponding to the another target identifier in the first preset region; and
displaying pictures respectively corresponding to other target identifiers in the second preset region, wherein the other target identifiers are identifiers other than the another target identifier in the M target identifiers.

2. The picture processing method according to claim 1, wherein the updating the first interface to the second interface comprises:
updating the first interface to the second interface when an overlap size between the one target identifier and the another target identifier is greater than or equal to a first preset threshold.

3. The picture processing method according to claim 1, wherein:
the second preset region comprises a first sub-region and a second sub-region; and
the displaying pictures respectively corresponding to other target identifiers in the second preset region comprises:
displaying a picture corresponding to the one target identifier in the first sub-region; and
displaying, in the second sub-region, pictures respectively corresponding to identifiers other than the one target identifier in the other target identifiers.

4. The picture processing method according to claim 1, wherein the performing synthesis processing on the M pictures according to a size of each of the M pictures to obtain a target synthesized picture comprises:
when there is an overlap region between every two pictures in the M pictures, cropping an overlap portion corresponding to one of the every two pictures according to an overlap size between the every two pictures, and performing synthesis processing on the cropped pictures and other pictures to obtain the target synthesized picture, wherein the other pictures are pictures other than the cropped pictures in the M pictures.

5. The picture processing method according to claim 1, wherein:
the second input comprises M−1 sub-inputs, wherein each sub-input is a drag input by the user for a picture in the M−1 pictures, and the M−1 pictures are pictures in the M pictures; and
the performing synthesis processing on the M pictures according to a size of each of the M pictures to obtain a target synthesized picture comprises:
performing synthesis processing on a first one of the pictures and a first target picture according to sizes of the first one of the pictures and the first target picture to obtain a first synthesized picture; and
performing synthesis processing on a second one of the pictures and the first synthesized picture according to sizes of the second one of the pictures and the first synthesized picture to obtain a second synthesized picture until synthesis processing is performed on an (M−1)th one of the pictures, to obtain the target synthesized picture,
wherein the first one of the pictures, the second one of the pictures and the (M−1)th one of the pictures are all pictures in the M−1 pictures, and the first target picture is a picture other than the M−1 pictures in the M pictures.

6. The picture processing method according to claim 5, wherein the performing synthesis processing on a first one of the pictures and a first target picture according to sizes of the first one of the pictures and the first target picture comprises:
when there is no overlap region between the first one of the pictures and the first target picture, cropping the first one of the pictures or the first target picture according to a width value of the first one of the pictures or a width value of the first target picture, and performing synthesis processing on the cropped picture and uncropped picture; or
when there is an overlap region between the first one of the pictures and the first target picture, cropping at least one of the first one of the pictures and the first target picture according to a width value of the overlap region, and performing synthesis processing based on the cropped picture.

7. A electronic device, comprising a memory having a computer program; and a processor, wherein the computer program, when executed by the processor, causes the processor to perform a picture processing method, comprising:
receiving a first input by a user after a first interface is displayed,
wherein:
the first interface comprises N target identifiers;
each target identifier indicates a picture respectively;
the first input is an input by the user for selecting M target identifiers in the N target identifiers;
N and M are both integers greater than 1; and
M is less than or equal to N;

displaying a second interface in response to the first input, wherein the second interface comprises M pictures respectively corresponding to the M target identifiers;
receiving a second input by the user operating to the M pictures; and
in response to the second input, performing synthesis processing on the M pictures according to a size of each of the M pictures to obtain a target synthesized picture,
wherein:
when M is equal to two, the first input is an input by the user dragging one target identifier to another target identifier; or
when M is greater than two, the first input comprises a first sub-input and a second sub-input,
wherein:
the first sub-input is a selection input by the user for the M target identifiers, and the second sub-input is an input by the user dragging one target identifier in the M target identifiers to another target identifier in the M target identifiers; or
the first sub-input is a selection input by the user for M−1 target identifiers in the N target identifiers, and the second sub-input is an input by the user dragging one target identifier in the M−1 target identifiers to another target identifier, or the second sub-input is an input by the user dragging another target identifier to one target identifier in the M−1 target identifiers, wherein the another target identifier is an identifier other than the M−1 target identifiers in the N target identifiers,
wherein:
the second interface comprises a first preset region and a second preset region;
the first preset region is configured to display a pinned-to-top picture, wherein when any picture has an overlap region with the pinned-to-top picture, the pinned-to-top picture covers the any picture in the overlap region;
before updating the first interface to the second interface, the picture processing method further comprises: determining a picture corresponding to the another target identifier as the pinned-to-top picture; and
the updating the first interface to the second interface comprises:
displaying the picture corresponding to the another target identifier in the first preset region; and
displaying pictures respectively corresponding to other target identifiers in the second preset region, wherein the other target identifiers are identifiers other than the another target identifier in the M target identifiers.

8. The electronic device according to claim 7, wherein the updating the first interface to the second interface comprises:
updating the first interface to the second interface when an overlap size between the one target identifier and the another target identifier is greater than or equal to a first preset threshold.

9. The electronic device according to claim 7, wherein:
the second preset region comprises a first sub-region and a second sub-region; and
the displaying pictures respectively corresponding to ither target identifiers in the second preset region comprises:
displaying a picture corresponding to the one target identifier in the first sub-region; and displaying, in the second sub-region, pictures respectively corresponding to identifiers other than the one target identifier in the other target identifiers.

10. The electronic device according to claim 7, wherein the performing synthesis processing on the M pictures according to a size of each of the M pictures to obtain a target synthesized picture comprises:
when there is an overlap region between every two pictures in the M pictures, cropping an overlap portion corresponding to one of the every two pictures according to an overlap size between the every two pictures, and performing synthesis processing on the cropped pictures and other pictures to obtain the target synthesized picture, wherein the other pictures are pictures other than the cropped pictures in the M pictures.

11. The electronic device according to claim 7, wherein:
the second input comprises M−1 sub-inputs, wherein each sub-input is a drag input by the user for a picture in the M−1 pictures, and the M−1 pictures are pictures in the M pictures; and
the performing synthesis processing on the M pictures according to a size of each of the M pictures to obtain a target synthesized picture comprises:
performing synthesis processing on a first one of the pictures and a first target picture according to sizes of the first one of the pictures and the first target picture to obtain a first synthesized picture; and
performing synthesis processing on a second one of the pictures and the first synthesized picture according to sizes of the second one of the pictures and the first synthesized picture to obtain a second synthesized picture until synthesis processing is performed on an (M−1)th one of the pictures, to obtain the target synthesized picture,
wherein the first one of the pictures, the second one of the pictures and the (M−1)th one of the pictures are all pictures in the M−1 pictures, and the first target picture is a picture other than the M−1 pictures in the M pictures.

12. The electronic device according to claim 11, wherein the performing synthesis processing on a first one of the pictures and a first target picture according to sizes of the first one of the pictures and the first target picture comprises:
when there is no overlap region between the first one of the pictures and the first target picture, cropping the first one of the pictures or the first target picture according to a width value of the first one of the pictures or a width value of the first target picture, and performing synthesis processing on the cropped picture and uncropped picture; or
when there is an overlap region between the first one of the pictures and the first target picture, cropping at least one of the first one of the pictures and the first target picture according to a width value of the overlap region, and performing synthesis processing based on the cropped picture.

13. A non-transitory readable storage medium, having a computer program or instruction stored thereon, wherein the computer program or instruction, when executed by a processor, causes the processor to implement a picture processing method, comprising:
receiving a first input by a user after a first interface is displayed,
wherein:
the first interface comprises N target identifiers;
each target identifier indicates a picture respectively;
the first input is an input by the user for selecting M target identifiers in the N target identifiers;
N and M are both integers greater than 1; and
M is less than or equal to N;
displaying a second interface in response to the first input, wherein the second interface comprises M pictures respectively corresponding to the M target identifiers;
receiving a second input by the user operating on the M pictures; and
in response to the second input, performing synthesis processing on the M pictures according to a size of each of the M pictures to obtain a target synthesized picture,
wherein:
when M is equal to two, the first input is an input by the user dragging one target identifier to another target identifier; or
when M is greater than two, the first input comprises a first sub-input and a second sub-input,
wherein:
the first sub-input is a selection input by the user for the M target identifiers, and the second sub-input is an input by the user dragging one target identifier in the M target identifiers to another target identifier in the M target identifiers; or
the first sub-input is a selection input by the user for M−1 target identifiers in the N target identifiers, and the second sub-input is an input by the user dragging one target identifier in the M−1 target identifiers to another target identifier, or the second sub-input is an input by the user dragging another target identifier to one target identifier in the M−1 target identifiers, wherein the another target identifier is an identifier other than the M−1 target identifiers in the N target identifiers,
wherein:
the second interface comprises a first preset region and a second preset region;
the first preset region is configured to display a pinned-to-top picture, wherein when any picture has an overlap region with the pinned-to-top picture, the pinned-to-top picture covers the any picture in the overlap region;
before updating the first interface to the second interface, the picture processing method further comprises: determining a picture corresponding to the another target identifier as the pinned-to-top picture; and
the updating the first interface to the second interface comprises:
displaying the picture corresponding to the another target identifier in the first preset region; and
displaying pictures respectively corresponding to other target identifiers in the second preset region, wherein the other target identifiers are identifiers other than the another target identifier in the M target identifiers.

14. The non-transitory readable storage medium according to claim 13, wherein the updating the first interface to the second interface comprises:
updating the first interface to the second interface when an overlap size between the one target identifier and the another target identifier is greater than or equal to a first preset threshold.

* * * * *